US006228184B1

(12) United States Patent
Tanaka et al.

(10) Patent No.: US 6,228,184 B1
(45) Date of Patent: May 8, 2001

(54) ROLLING MEMBER

(75) Inventors: Susumu Tanaka; Kenji Yamamura; Manabu Obori, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/576,265

(22) Filed: May 24, 2000

Related U.S. Application Data

(62) Division of application No. 09/060,810, filed on Apr. 16, 1998, now Pat. No. 6,086,686.

(30) Foreign Application Priority Data

Apr. 16, 1997 (JP) .......................................... 9-99436
Feb. 23, 1998 (JP) .................................... 10-40847

(51) Int. Cl.$^7$ ................................................. C22C 38/18
(52) U.S. Cl. .................... 148/325; 148/906; 384/492; 384/912
(58) Field of Search ................... 148/325, 906; 384/492, 912

(56) References Cited

FOREIGN PATENT DOCUMENTS

| 1417337 | 12/1975 | (GB) | ............... | C22C/38/18 |
| 2 073 249 | 10/1981 | (GB) . | | |
| 2 310 466 | 8/1987 | (GB) | ............... | F16C/33/30 |
| 520331 | 4/1994 | (GB) . | | |
| 2 284 824 | 6/1995 | (GB) . | | |
| 2 288 188 | 10/1995 | (GB) | ............... | C22C/38/52 |
| 2 294 980 | 5/1996 | (GB) | ............... | F16C/33/30 |
| 2 306 505 | 5/1997 | (GB) | ............... | C22C/38/18 |
| 61-0163244 | 7/1986 | (JP) . | | |
| 3-173747 | 7/1991 | (JP) . | | |
| 86-23480/36 | 7/1986 | (WO) | ............... | C22C/38/18 |

OTHER PUBLICATIONS

Combined Search and Examination Report for British Patent Application No. GB 0005716.6.
Combined Search and Examination Report date Jun. 12, 1998 for Application No. GB 9808020.3.

*Primary Examiner*—Deborah Yee
(74) *Attorney, Agent, or Firm*—Sughrue, Mion, Zinn Macpeak & Seas, PLLC

(57) ABSTRACT

An inexpensive rolling apparatus improved in resistance to fretting, acoustic performance, resistance to corrosion, life and workability is provided. At least one of an outer member, an inner member and rolling elements of the apparatus is formed of an alloy steel containing 1.5% by weight or less of C, 10% to 20% by weight of Cr, 0.1% to 0.8% by weight of Mn, 0.1% to 1.0% by weight of Si and less than 0.2% by weight of N, particularly, at least one of the outer member, the inner member and the rolling elements is formed of a martensitic stainless steel containing 0.6% by weight or less of C, 10% to 14% by weight of Cr, 0.1% to 0.8% by weight of Mn, 0.1% to 1.0% by weight of Si, less than 0.2% by weight of N, 0.5% by weight or less of Mo, 0.2% by weight or less of V, and Fe and inevitable components as the balance, wherein the relationship between the content of C and that of Cr satisfies C % $\leq$ –0.05 Cr %+1.41; the relationship between a specific relational equation eq1 indicating the content of elements accelerating the conversion of the raw material to ferrite, taken as (eq1)=Cr %+Si %+1.5 Mo %+3.5 V %, and a specific relational equation eq2 indicating the content of elements accelerating the conversion of the raw material to austenite, taken as (eq2)=C %+0.83 N %+0.12 Mn %, satisfies (eq2)$\geq$0.04×(eq1)–0.39, (eq1)$\leq$14.0 and (eq2)$\leq$0.8; and the total content of C and N satisfies C+N$\geq$0.45%.

4 Claims, 10 Drawing Sheets

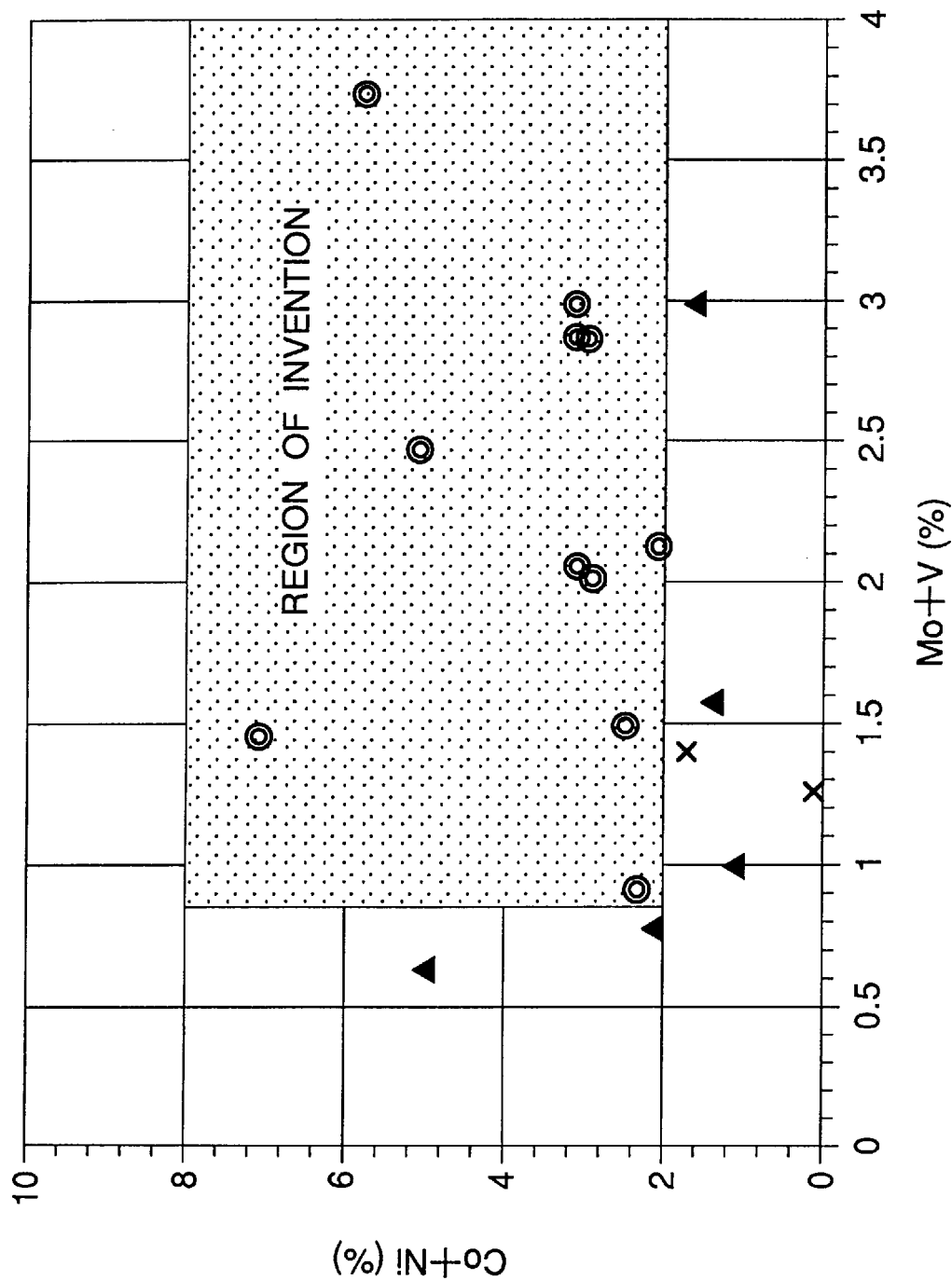

ROLLING MEMBER

This is a divisional of application Ser. No. 09/060,810, filed Apr. 16, 1998, which is now U.S. Pat. No. 6,086,686 issued Jul. 11, 2000 the disclosure of which is incorporated herein by reference.

FIELD OF THE INVENTION

The present invention relates to rolling bearings used in precision instruments such as HDD (hard disk drive) or VTR, food machines, aircraft, machine tools and semiconductor-related instruments, linear guide bearings and rolling apparatuses such as ball screw apparatuses, and more particularly to rolling apparatuses excellent in characteristics such as resistance to fretting, acoustic performance, corrosion resistance and workability obtained by improving material compositions.

BACKGROUND OF THE INVENTION

In general, materials which have been used for rolling bearings include SUJ2 for bearing steels, SUS 440C and 13Cr martensitic stainless steels for stainless steels, and steel products corresponding to SCR 420 and SCM 420 for case hardening steels. The rolling bearings are used while being subjected to repeated shear stress under high contact pressure. In order to ensure rolling fatigue strength resisting the shear stress, therefore, hardening and tempering are performed to bearing steels, hardening, subzero treatment and tempering to stainless steels, and hardening and tempering to case hardening steels after carburizing or carbonitriding to realize a hardness of 58 to 64 in HRC.

However, these rolling bearings are used under a great variety of circumstances, and the use of ball bearing steels causes the possibility of early rusting by salt damages in regions adjacent to sea, invasion of water or sea water, or exposure or use under corrosive circumstances such as wetted conditions and the like.

Then, in the rolling bearings used under corrosive circumstances or particularly requiring the prevention of rusting, high carbon Cr martensitic SUS 440C has hitherto been used as stainless ball bearing steels excellent in corrosion resistance and having a hardness of 58 or more in HRC which is necessary for the bearings.

Further, the rolling bearings used in various spindles, various spindle motors and swing arms of HDD devices are required to have excellent rotational and acoustic performances and resistance to fretting, and to be small in torque fluctuations. However, the conventional stainless steels contain a number of coarse eutectic carbides having a size of more than 10 $\mu$m, so that it is difficult to obtain desired working accuracy. For example, the acoustic performance thereof is liable to be inferior to those of the rolling bearings made of ball bearing steels.

Then, in the spindle motors particularly used for driving magnetic discs for rotation and requiring sufficient rotational and acoustic performances, the rolling bearings made of ball bearing steels are used in many cases for this reason. In contrast, the rolling bearings for swing arms used for driving the swing arms performing access positioning to effective areas of the magnetic discs are used under swinging conditions. It is therefore difficult to form oil films between the rolling elements and races, so that torque fluctuations and torque spikes are developed by fretting wear to cause harm to the read function of the HDD devices in some cases.

Accordingly, high carbon Cr stainless steels good in resistance to fretting are used in many cases in the rolling bearings for swing arms, and in recent years, 13Cr martensitic stainless steels improved in rotational and acoustic performances are often used as stainless ball bearing steels for the rolling bearings used in the swing arms of the HDD devices and the like.

On the other hand, in the case of linear guide bearing apparatuses comprising guide rails and sliders, or ball screw apparatuses comprising screw shafts and nuts, JIS-SUS 440C and 13Cr martensitic stainless steels (carbon contents 0.6% to 0.7%) and further precipitation hardening type stainless steels such as JIS-SUS 630 are used as corrosion-resistant stainless materials used therein.

Case of Rolling Bearings

In the high carbon Cr stainless steels as described above, when the content of C and Cr is increased, for example, when C is contained in an amount of more than 0.6% by weight, a number of coarse eutectic carbides having a size of more than 10 $\mu$m are formed coupled with a large amount of Cr. These not only reduce the fatigue strength, toughness and resistance to corrosion of the rolling members, but also deteriorate workability such as the malleability and machinability.

Further, the presence of the coarse eutectic carbides sometimes adversely affects the acoustic performance of the rolling bearings. The acoustic performance indicates the degree of noise developed by signals generated in operation of the rolling bearings, and often causes a serious problem in relatively small-sized stainless steel rolling bearings used in precision instruments such as HDD devices which are apt to be easily damaged by vibration.

That is to say, the vibration developed in the bearings largely depends on the configurational accuracy of outer races, inner races or shaft elements, and rolling elements thereof. Accordingly, when materials containing the coarse eutectic carbides are used for the bearings, the coarse carbides inhibit the achievement of desired accuracy in finishing the bearings, and further, the difference in wear between grounds and the eutectic carbides arises also in rotation operation to cause a reduction in accuracy of roughness and the like. Furthermore, these eutectic carbide particles interfere with one another at their contact surfaces, resulting in increased noise.

As described above, the coarse eutectic carbides not only deteriorate the acoustic performance of the bearings, but also become sources of stress concentration to decrease the fatigue strength, and further to cause deterioration in toughness and resistance to corrosion. Accordingly, the high carbon Cr martensitic stainless steels such as SUS 440C not only have no sufficient resistance to corrosion and no mechanical strength, but also is extremely poor in acoustic performance, and is further high in cost. It has been therefore impossible to suitably use it for the rolling bearings used under corrosive circumstances or the rolling bearings used in various spindles, various spindle motors and the swing arms for the HDD devices.

Further, these rolling bearings are fixed with adhesives in many cases, and adhesion of rust preventive oil raises various problems. For example, the adhesive strength is decreased, or the rust preventive oil chemically reacts with the adhesives to contribute development of rust and further to generate out gas, which adheres to disc surfaces to reduce reliability of the HDD devices. Accordingly, the rolling bearings are completely degreased in many cases. It is therefore considered that stainless steels are better for the rolling bearings. However, stainless steels are high in cost compared with bearing steels such as SUJ2. Moreover, it contains a number of coarse eutectic carbides, although it is good in resistance to corrosion and resistance to fretting compared with SUJ2. It is therefore difficult to obtain target working accuracy. Further, these rolling bearings tends to be inferior to ones made of SUJ2 in acoustic performance, so that it is difficult to use them for the rolling bearings for spindle motors requiring high rotational and acoustic performances. Furthermore, with respect to the rolling bearings for various spindles, further improvements in resistance to fretting during conveyance and operation of the spindles have been desired.

JP-B-5-2734 (the term "JP-B" as used herein means an "examined Japanese patent publication") discloses martensitic stainless steel rolling bearings significantly improved in acoustic performance and fatigue strength in which the content of C and Cr is decreased to inhibit formation of eutectic carbides. However, they are inferior to SUJ2 in the size of carbides, and are not only poor in acoustic performance, but also take cost into no consideration. Further, this publication discloses no resistance to fretting which is a required characteristic for the rolling bearings for HDD swing arms at all, and further describes no workability at all.

Further, in JP-A-6-117439 (the term "JP-A" as used herein means an "unexamined published Japanese patent application"), attempts have been made to form both or one of outer races and inner races of martensitic stainless steels, and to form rolling elements of ball bearing steels, thereby reducing cost and improving the acoustic performance. However, stainless steels used in races in this publication are the same as the martensitic stainless steels described in JP-B-5-2734. These stainless steels are inferior to ball bearing steels such as SUJ2 in acoustic performance, so that the ball bearings described in this publication are inferior to ball bearings in which inner races, outer races and rolling elements are all formed of ball bearing steels in acoustic performance. Similarly to JP-B-5-2734, this publication also discloses no resistance to fretting which is a required characteristic for the rolling bearings for HDD swing arms at all, and further describes no workability at all.

In the case where the resistance to corrosion is required, both the above-mentioned prior techniques do not have the sufficient measures necessarily.

Case of Linear Guide Bearing Apparatuses and Ball Screw Apparatuses

When parts used are in complicated deformed cross sectional form, like sliders and guides of linear guide devices, raw materials are deformedly cold drawn to a form as near to the form of finished articles as possible in many cases. Accordingly, stainless steels difficult to be worked are high in resistance to deformation and work hardening, so that they have the problem that the deformed drawing thereof is highly expensive and time-consuming, resulting in extremely high cost compared with case hardening steels such as SCM 420 and SCR 420 which are relatively good in workability and carbon steels for machine structural use such as S 45C and S 53C.

In particular, precipitation hardening type stainless steels such as SUS 630 are highly corrosion-resistant, but they have a hardness of about 33 to about 36 in HRC even in the solution-treated state. These stainless steels are therefore extremely poor in cold workability, resulting in a very high production cost of parts , so that they are not used so much except specific fields such as atomic power-related fields.

Then, 13Cr high carbon martensitic stainless steels have recently been used in which the content of C and Cr in SUS 440C difficult to be worked is decreased to improve cold deformedly drawing workability. However, even in this material, the improving effect is insufficient yet. Dies are early broken, or revisions become necessary. Thus, the problems are not sufficiently solved.

Further, the conventional high carbon martensitic stainless steels are work hardened to sometimes develop aging cracks vertically along a groove largest in the reduction ratio of area in deformedly drawing it. Special attention such as tempering immediately after drawing should be given.

Similarly to the rolling bearings, the linear guide apparatuses having the above-mentioned rolling elements are often used while being subjected to repeated shear stress under high contact pressure. In order to ensure rolling fatigue strength resisting the shear stress, therefore, tempering is performed after forming to increase the surface hardness in production thereof. As the conventional tempering methods, methods of conducting through hardening under vacuum and methods of conducting induction hardening are known. However, in the former, the whole parts are heated to high temperatures, followed by rapid cooling. Accordingly, more deformed or longer parts results in larger unbalance in cooling velocity of the whole parts, which causes large deformation and bend of the parts in some cases.

On the other hand, the latter induction hardening methods have the advantages that partial hardening can be easily performed by the design of hardening coils, that deformation, bend and twist are scarcely developed because of no necessity to apply heat to the whole parts, and that the deformation and the like are easily corrected, because non-hardened layers such as core portions are sufficiently soft. Accordingly, of the parts such as the rails and sliders constituting the linear guide devices, particularly, deformed or long ones are hardened by the latter induction hardening in many cases.

However, the conventional stainless steels are low in diffusion velocity of carbon compared with carbon steels for machine structural use, and further, coarse eutectic carbides formed in the course of solidification are difficult to be dissolved in grounds. It is therefore difficult to obtain the depth of hardened layers by heating for a short period of time according to induction hardening. When the deep depth of the hardened layers is intentionally obtained by high frequency output or hardening velocity, the excess dissolution of the carbides lowers the Ms point to inhibit the martensitic transformation. Accordingly, a large amount of the remaining untransformed austenite raise the problem of failure to obtain sufficient surface hardness or generation of unevenness in hardness. Further, the conventional stainless steels contain a number of coarse eutectic carbides independent of hardening methods, so that they act as sources of stress concentration to decrease the rolling fatigue strength, and further to have no sufficient resistance to corrosion.

JP-A-2-310342 and JP-A-3-138335 disclose martensitic stainless steels for cold forging and methods for producing them. These stainless steels contain not only the insufficient content of carbon contributing to solid solution or precipitation strengthening, but also no nitrogen having suitable influences on the rolling fatigue strength, wear resistance and resistance to corrosion. They are therefore insufficient for bearing application receiving repeated fatigue under high contact pressure.

Further, the linear guide devices and the ball screw apparatuses are accompanied by repeated reciprocating motion at short stroke, so that they require the resistance to fretting, similarly to the rolling bearings.

Case of Ones Used under Severe Conditions Such As Corrosive Conditions (Problems common to Rolling Bearings, Linear Guide Bearing Apparatuses and Ball Screw Apparatuses)

When the resistance to corrosion is particularly required for the above-mentioned rolling apparatuses such as the rolling bearings, the linear guide bearing apparatuses and the ball screw apparatuses, hard Cr plating, fluoride laident and other various surface coating treatments are performed on these stainless steels, bearing steels and further carburized or carbonitrided case hardening steels. However, the rolling bearings have the problem that they are damaged in the vicinities of surfaces thereof by fatigue and wear to easily separate off coatings discontinuous to base phases, resulting in failure to obtain sufficient durability.

On the other hand, German Patent No. 3,901,470 discloses that unprecedented highly corrosion-resistant and high functional martensitic stainless steels are obtained by substituting carbon by nitrogen. Such stainless steels have recently been presented in many literatures mainly in Europe (*Proceeding of International Congress Stainless Steel*, 42–46 (1996) and the like) (material name: Cronidur 30 or X30).

In general, addition of nitrogen to stainless steels are mainly conducted in austenitic stainless steels. Martensitic stainless steels have the problem that the solubility of nitrogen is low and therefore inclusion of a large amount of nitrogen induces the development of bubbles in the course of solidification to introduce a large number of pores into ingots, resulting in damage of the soundness of the materials. Accordingly, this technique has not hitherto been actively made, and has scarcely come in practice.

In contrast, the above-mentioned German Patent makes it possible to alloy more than 0.3% of nitrogen by performing steel production in a pressure vessel under an atmosphere of nitrogen having a pressure of tens of atmospheres. However, in other words, the steel production in a pressure vessel is necessary, and the course of steel production becomes special. There is therefore the problem that an increase in cost is unavoidable in terms of investment in equipment and productivity.

Further, materials used for applications of aircraft and corrosion-resistant bearings used at relatively high temperatures require not only excellent resistance to corrosion, but also excellent durability at high temperatures. However, as to the materials described in the above-mentioned German Patent, there is still room for improvement in this respect.

SUMMARY OF THE INVENTION

An object of the present invention is to provide a rolling apparatus free from the above-mentioned problems.

Another object of the present invention is to provide a rolling bearing, particularly a ball bearing, at low cost, in which a material composition having excellent resistance to corrosion is further improved to impart good workability thereto, which is excellent not only in rolling life, but also in functions such as the resistance to fretting and acoustic performance, and which can be suitably used as one adhered to a shaft with an adhesive particularly in an assembling stage of a bearing used under corrosive circumstances or an HDD device (accordingly, one requiring the resistance to corrosion).

Still another object of the present invention is to provide a rolling device for a linear guide apparatus or a ball screw apparatus, which is excellent not only in rolling life, but also in resistance to fretting, further significantly excellent in resistance to corrosion, can be used under corrosive circumstances or at high temperatures, is excellent in workability and can be provided at low cost.

A further object of the present invention is to provide a rolling bearing, particularly a ball bearing, excellent in functions such as rolling life, resistance to fretting and acoustic performance at low cost, by optimizing the combination of constituent parts, in the case where the resistance to corrosion is relatively unnecessary.

A still further object of the present invention is to provide a rolling member for a rolling bearing, a linear guide apparatus or a ball screw apparatus, which is particularly suitable for use under severe circumstances such as corrosive conditions.

The present inventors have discovered that the above-mentioned objects can be attained by a rolling apparatus comprising an outer member, an inner member and a plurality of rolling elements disposed therebetween, the rolling elements rolling in contact with a first contact surface of the outer member and a second contact surface of the inner member facing thereto, wherein at least one of the outer member, the inner member and the rolling elements is formed of an alloy steel containing 1.5% by weight or less of C, 10% to 20% by weight of Cr, 0.1% to 0.8% by weight of Mn, 0.1% to 1.0% by weight of Si and less than 0.2% by weight of N.

In particular, in the rolling apparatus of the present invention, at least one of the outer member, the inner member and the rolling elements is formed of at least one suitably selected from the following (1) to (6), depending on the more detailed object.

First, the materials particularly low in cost, excellent in resistance to corrosion, and further excellent in acoustic characteristics, resistance to fretting or workability include the following (1) to (3).

(1) A martensitic stainless steel containing 0.6% by weight or less of C, 10% to 14% by weight of Cr, 0.1% to 0.8% by weight of Mn, 0.1% to 1.0% by weight of Si, less than 0.2% by weight of N, 0.5% by weight or less of Mo, 0.2% by weight or less of V, and Fe and inevitable components as the balance, wherein (a) the relationship between the content of C and that of Cr satisfies C %$\leq$−0.05 Cr %+1.41;

(b) the relationship between a specific relational equation eq1 indicating the content of elements accelerating the conversion of the raw material to ferrite, taken as (eq1)=Cr %+Si %+1.5 Mo %+3.5 V %, and a specific relational equation eq2 indicating the content of elements accelerating the conversion of the raw material to austenite, taken as (eq2)=C %+0.83 N %+0.12 Mn %, satisfies (eq2)$\geq$0.04×(eq1)−0.39, (eq1)$\leq$14.0, and (eq2)$\leq$0.8; and (c) the total content of C and N satisfies C+N$\geq$0.45% (Steel I);

(2) A steel having a hardness of 57 or more in HRC, secondary hardenability and a nitride layer of 2% or less of a diameter Da of a rolling element on a surface layer of a finished article (Steel II); and (3) A martensitic stainless steel excellent in silence and resistance to corrosion, which contains 0.30% to 0.45% by weight of C, 10.5% to 13.5% by weight of Cr, 0.1% to 0.8% by weight of Mn, 0.1% to 1.0% by weight of Si, 0.05% to 0.19% by weight of N, and Fe and inevitable components as the balance, wherein C+N is 0.5% by weight or more (Steel III).

As the material for a member effective for resistance to fretting or acoustic characteristics by use in combination with a rolling member formed of the above-mentioned (1) or (3), or a high Cr martensitic stainless steel, there is a material of (4).

(4) A specific high carbon steel containing 0.8% to 1.5% by weight of C, 0.1% to 2.0% by weight of Cr, 0.1% to 1.5% by weight of Mn, 0.1% to 1.0% by weight of Si, and Fe and inevitable components as the balance.

Then, the materials for a rolling member requiring particularly severe resistance to corrosion include the following (5) and (6).

(5) A martensitic stainless steel containing 0.45% by weight or less of C, 15% to 20% by weight of Cr, 0.1% to 0.8% by weight of Mn, 0.1% to 1.0% by weight of Si, 0.05% to less than 0.2% by weight of N, 0.5% to 3.0% by weight of Mo, 1.5% by weight or less of Ni, 2.0% by weight or less of Cu, and Fe and inevitable components as the balance, wherein the relationship between the content of C and that of Cr satisfies C %≧−0.05 Cr %+1.41;

the relationship between a specific relational equation eq1 indicating the content of elements accelerating the conversion of the raw material to ferrite, taken as (eq1)=Cr %+Si %+1.5 Mo %, and a specific relational equation eq2 indicating the content of elements accelerating the conversion of the raw material to austenite, taken as (eq2)=C %+0.83 N %+0.12 Mn %+0.05 Ni %+0.02 Cu %, satisfies (eq2)≧0.04×(eq1)−0.39;

the total content of C and N satisfies C+N≧0.4%; and the pitting index PI value satisfies PI=Cr %+3.3 Mo %+30 N %−45 C %≧10.0 (Steel IV); and (6) A martensitic stainless steel containing 0.45% by weight or less of C, 15% to 20% by weight of Cr, 0.1% to 0.8% by weight of Mn, 0.1% to 1.0% by weight of Si, 0.05% to less than 0.2% by weight of N, 0.5% to 3.0% by weight of Mo, 1.5% by weight or less of Ni, 2.0% by weight or less of Cu, 1.0% to 7.0% by weight of Co, 1.0% by weight or less of V, and Fe and inevitable components as the balance, wherein Mo+V is 0.8% to 4.0% by weight;

Co+Ni is 2.0% to 8.0% by weight;

the relationship between the content of C and that of Cr satisfies C %≦−0.05 Cr %+1.41;

the relationship between a specific relational equation eq1 indicating the content of elements accelerating the conversion of the raw material to ferrite, taken as (eq1)=Cr %+Si %+1.5 Mo %+3.5 V %, and a specific relational equation eq2 indicating the content of elements accelerating the conversion of the raw material to austenite, taken as (eq2)=C %+0.83 N %+0.12 Mn %+0.05(Ni+Co)%+0.02 Cu %, satisfies (eq2)≧0.04× (eq1)−0.39 and (eq2)≦0.8;

the total content of C and N satisfies C+N≧0.4%; and the pitting index PI value satisfies PI=Cr %+3.3 Mo % +30 N %−45 C %≧10.0 (Steel V).

Further, preferred embodiments of the present invention include the following:

(a) A rolling bearing having a plurality of rolling members comprising an outer race and an inner race or a shaft element, and a plurality of rolling elements disposed between the outer race and the inner race or the shaft element, wherein at least one of the rolling members is formed of the above-mentioned martensitic stainless steel of (1);

(b) The rolling bearing of the above-mentioned (a), wherein the rolling elements are formed of a high carbon Cr martensitic stainless steel;

(c) A rolling bearing having a plurality of rolling members comprising an outer race and an inner race or a shaft element, and a plurality of rolling elements disposed between the outer race and the inner race or the shaft element, wherein the outer race and the inner race or the shaft element are formed of the above-mentioned specific high carbon steel of (4), and the rolling elements are formed of a high Cr martensitic stainless steel;

(d) The rolling bearing of the above-mentioned (c), wherein the rolling elements are formed of a high Cr martensitic stainless steel containing 0.05% to less than 0.2% by weight of N;

(e) A rolling bearing having a plurality of rolling members comprising an outer race and an inner race or a shaft element, and a plurality of rolling elements disposed between the outer race and the inner race or the shaft element, wherein at least one of the outer race, the inner race or the shaft element, and the rolling elements are formed of the above-mentioned secondary hardenable steel of (2) containing 0.45% by weight or less of C, 12.0% to 13.5% by weight of Cr, 0.1% to 0.8% by weight of Mn, 0.1% to 1.0% by weight of Si, 0.05% to 0.5% by weight of N and 3.0% by weight or less of Mo, wherein C+N is 0.5% by weight or more, and a fine carbide having a particle size of 2.0 μm or less is dispersed in the above-mentioned nitride layer;

(f) The rolling bearing of the above-mentioned (e), wherein the rolling elements are formed of a ceramic material;

(g) A rolling bearing having a plurality of rolling members comprising an outer race and an inner race or a shaft element, and a plurality of rolling elements disposed between the outer race and the inner race or the shaft element, wherein at least one of the rolling members is formed of the above-mentioned stainless steel of (3) containing a carbide having a particle size of 2.0 μm or less and an area fraction of 5% or less;

(h) The rolling bearing of the above-mentioned (g), wherein the stainless steel of (3) satisfies at least one of O≦20 ppm, Ti+0.1 Al≦50 ppm and S≦100 ppm;

(i) The rolling bearing, wherein at least one of the outer race and the inner race or the shaft element is formed of the above-mentioned stainless steel of (3), and the rolling elements are formed of the above-mentioned specific high carbon steel of (4);

(j) The rolling bearing of the above-mentioned (i), wherein the outer race and the inner race or the shaft element are formed of a material containing a carbide having a particle size of 2.0 μm or less and an area fraction of 5% or less, and the rolling elements, the outer race and the inner race or the shaft element satisfy at least one of O≦20 ppm, Ti+0.1 Al≦50 ppm and S≦100 ppm;

(k) A linear guide bearing apparatus having a plurality of rolling members comprising a guide rail, a slider and a plurality of rolling elements, or a ball screw apparatus having a plurality of rolling members comprising a screw shaft, a nut and a plurality of rolling elements, wherein at least one of the rolling elements is formed of the above-mentioned stainless steel of (1), and particularly C+N is 0.7% by weight or less in the stainless steel (1);

(l) The linear guide bearing apparatus or the ball screw apparatus of the above-mentioned (k), wherein a rolling surface with the rolling elements has a hardened surface by induction hardening;

(m) A rolling apparatus comprising an outer member, an inner member and a plurality of rolling elements disposed therebetween, wherein at least one of the outer member, the inner member and the rolling elements is formed of the above-mentioned stainless steel of (5) (Steel IV); and (n) A rolling apparatus comprising an outer member, an inner member and a plurality of rolling elements disposed therebetween, wherein at least one of the outer member, the inner member and the rolling elements is formed of the above-mentioned stainless steel of (6) (Steel V).

BRIEF DESCRIPTION OF THE DRAWINGS

FIGS. 3a and 3b are schematic views showing a surface damage type radial strength tester, wherein FIG. 3a is a plan view thereof and FIG. 3b is a cross sectional view taken along line a–a' in FIG. 3a.

FIG. 10 is a graph showing a correlation between the content of Co+Ni or Mo+V and the high-temperature life.

DETAILED DESCRIPTION OF THE INVENTION

Case of Roiling Bearings

First Embodiment

Figure 1:
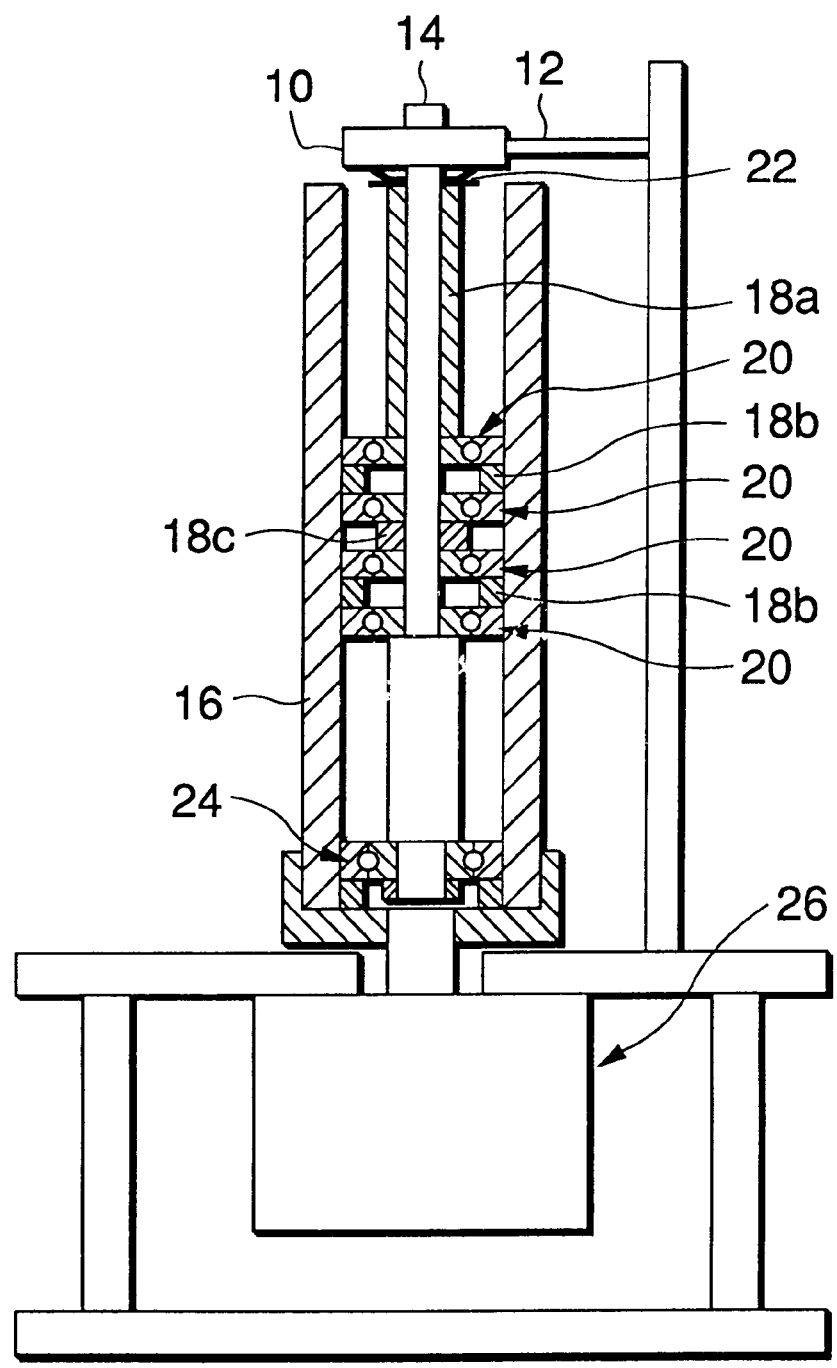
FIG. 1 is a front view showing a fretting fatigue tester.

In Japanese Patent Application No. 7-271111 (JP-A-9-287053), the present inventors have previously found out the relationship between the concentrations of C and Cr which forms no coarse eutectic carbide, have reduced the carbon concentration in the steel which adversely affects the resistance to corrosion, and have added nitrogen having a solid solution strengthening action similarly to carbon instead thereof, thereby (1) inhibiting formation of the coarse eutectic carbide, (2) greatly improving the resistance to corrosion by addition of nitrogen, and (3) improving the hardness and the wear resistance by the precipitation strengthening action and solid solution strengthening action of nitrogen. Thus, the present inventors have invented the martensitic stainless steel which can be suitably used in bearings.

However, the above-mentioned invention only improves the function of the bearings, and no reference is made to the workability which is very important with respect to cost and the resistance to fretting which is a required characteristic for the bearings for HDD swing arms.

Then, in order to improve the productivity and develop a high-functional stainless steel for a bearing at low cost, the present inventors have conducted intensive investigation on the influence of alloy components. As a result, the present inventors have discovered that a reduction in carbon content and addition of nitrogen instead thereof allows a coarse hard eutectic carbide to disappear to form a fine spherical carbide-nitride, that the restriction of the content of Si, Mn, Cr, Mo and V within a certain threshold range can inhibit an increase in hardness after annealing and greatly improve the workability to provide a high-functional inexpensive stainless steel bearing, and further that the use of this material on the race side and a high carbon Cr martensitic stainless steel on the rolling element side can more improve the resistance to fretting as compared with the use of a single material to provide a rolling bearing which can be suitably used as a bearing for HDD swing arms.

That is to say, this rolling bearing has a plurality of rolling members each comprising an outer race and an inner race or a shaft element, and a plurality of rolling elements disposed between the outer race and the inner race or the shaft element, wherein at least one of the rolling members is formed of a martensitic stainless steel containing 0.6% by weight or less of C, 10% to 14% by weight of Cr, 0.1% to 0.8% by weight of Mn, 0.1% to 1.0% by weight of Si, less than 0.2% by weight of N, 0.5% by weight or less of Mo, 0.2% by weight or less of V, and Fe and inevitable components as the balance, wherein the relationship between the content of C and that of Cr satisfies C %≦−0.05 Cr %+1.41; the relationship between a specific relational equation eq1 indicating the content of elements accelerating the conversion of the raw material to ferrite, taken as (eq1)=Cr %+Si %+1.5 Mo %+3.5 V %, and a specific relational equation eq2 indicating the content of elements accelerating the conversion of the raw material to austenite, taken as (eq2)=C %+0.83 N %+0.12 Mn %, satisfies (eq2)≧0.04×(eq1)−0.39, (eq1)≦14.0 and (eq2)≦0.8; and the total content of C and N satisfies C+N≧0.45% (steel I of the invention).

More preferably, the rolling bearing comprises an outer race, an inner race or a shaft having groove(s), and a plurality of rolling elements which are disposed between the outer race and the inner race or between the outer race and the shaft, at least one of the rolling members (except for the rolling elements) which are used in rolling contact with the rolling elements, i.e., at least one of the inner race (or the shaft) and the outer race is made of this martensitic stainless steel and the rolling elements are made of a high carbon Cr martensitic stainless steel.

Second Embodiment

In order to provide a high-functional rolling bearing for various spindles, spindle motors and HDD devices at low cost, the present inventors have studied improvements in acoustic performance and resistance to fretting by using high carbon steels such as bearing steels low in material cost and working cost in the outer and inner races having a great cost reduction effect, and different materials in the rolling elements.

The studies have showed that (1) the use of high carbon steels in the races and stainless steels in the rolling elements more improves the roughness accuracy of the races than the conventional stainless steel rolling bearings and removes the mutual interference of coarse carbide particles to exhibit excellent acoustic performance, and that (2) although the contact of the high carbon steels with the stainless steels slightly increases the fretting abrasion in the stainless steels as compared with the contact of single materials, the fretting on the high carbon steel side is extremely inhibited, resulting in a significant improvement in the resistance to fretting, as compared with the conventional rolling bearings made of bearing steels.

Namely, the present inventors have discovered that the use of the stainless steels in the races and the high carbon steels in the rolling elements not only give a small effect to cost, but also causes easy fretting damage on the stainless steel race side, compared with the case where both the races and the rolling elements are constituted by the single stainless steel materials, unfavorably resulting in damage of the inherent functions of the stainless steels, and the combination of the high carbon steels used in the races and the stainless steels used in the rolling elements is suitable, particularly, in the case where fretting is problematic such as bearings for swing arms. The reason is that microslips between the race (or the shaft) and the ball caused by sudden acceleration and deceleration of oscillation movement shift a rolling site of the ball with the opposite member (the race or the shaft) little by little, whereas the race (or the shaft) is disadvantageous in the fretting because of its small shift.

Further, it is revealed that when nitrogen is used as a component of the stainless steel, nitrogen enhances a friction decreasing effect of a passive state membrane, or a transferred membrane is liable to be formed on the other side in contact therewith, which makes it possible to inhibit the fretting damage of the opposite member.

Furthermore, it has become clear that the use of the high carbon steel in the race and the stainless steel in the rolling element can reduce the internal friction because the high carbon steel is somewhat harder than the stainless steel, and tends to decrease the start-rotation torque of the bearing because of the decreased specific gravity of the rolling element, which makes it possible to suitably use this bearing as a bearing for various spindles, various spindle motors and swing arms for HDD devices.

That is to say, this rolling baring has a plurality of rolling members each comprising an outer race, an inner race or a shaft element, and a plurality of rolling elements disposed between the outer race and the inner race or between the outer race and the shaft element, wherein at least one of the rolling members except the rolling elements is formed of the specific high carbon steel of the above (4) containing 0.8% to 1.5% by weight (preferably, 0.9% by weight or less) of C, 0.1% to 2.0% by weight (preferably, 0.6% by weight or less) of Cr, 0.1% to 1.5% by weight of Mn, 0.1% to 1.0% by weight of Si, and Fe and inevitable components as the balance, and the rolling elements are formed of a high Cr martensitic stainless steel, particularly preferably a high Cr martensitic stainless steel containing 0.05% to less than 0.2% by weight of nitrogen.

According to this embodiment, the rolling bearing used for various spindles, various spindle motors and swing arms for HDD devices can be provided at low cost by constituting the outer race and the inner race or the shaft element which have hitherto been constituted by the single material and to which cost is easily reflected, with the high carbon steel which is inexpensive and good in workability, and using the stainless steel in the rolling elements which are small in volume and simple in shape and which material cost including working cost is not reflected to so much, and further, the mutual interference of carbide particles is eliminated thereby. Furthermore, improvements in the hardness and the roughness accuracy of the race provide low torque, narrow fluctuation in torque and excellent acoustic performance, and can further improve oscillation durability by a fretting decreasing effect of the stainless steel to the other material. In addition to a wear reducing effect of the rolling element, the coefficient of linear expansion and the specific gravity of the rolling element is small, so that this embodiment can also be suitably used as a rolling bearing for machine tools used at high-speed rotation.

This embodiment may further be applied to the linear guide apparatuses and the ball screw apparatuses. For the linear guide apparatuses, the rails and the sliders are formed of the above-mentioned high carbon steel (4), and the rolling elements are formed of the high Cr martensitic stainless steel. For the ball screw apparatuses, the screw shafts and the nuts are formed of the above-mentioned high carbon steel (4), and the rolling elements are formed of the high Cr martensitic stainless steel. In that case, it is further preferred that the rolling elements contain 0.05% to 0.20% by weight of N, as is the case with the rolling bearings.

Third Embodiment

In recent years, the rolling bearings used for various spindles, various spindle motors and swing arms used in HDD devices have been requested to have higher resistance to fretting, and further improvements have been required toward near future. Then, the present inventors have conducted intensive investigation to develop the rolling bearing having both the excellent acoustic performance and resistance to fretting.

A third embodiment of the rolling bearing according to the present invention attaining the above-mentioned objects has a plurality of rolling members each comprising an outer race, an inner race or a shaft element, and a plurality of rolling elements disposed between the outer race and the inner race or the shaft element, wherein at least one of the rolling members is formed of a steel having secondary hardenability and a nitride layer of 2% or less of a diameter Da of a rolling element on a surface layer of a finished article (steel II of the invention). More preferred examples of the rolling bearings include a rolling bearing having a plurality of rolling members each comprising an outer race, an inner race or a shaft element, and a plurality of rolling elements disposed between the outer race and the inner race or the shaft element, wherein at least one of the rolling members is formed of a steel having secondary hardenability and a nitride layer of 2% or less of a diameter Da of a rolling element on a surface layer of a finished article, the rolling element being further formed of a ceramic material.

This embodiment has a nitride layer (nitrogen-enriched layer) comprising Cr nitride and Fe nitride as a surface layer, the nitride layer being one nitrided at a temperature of 480° C. or less, preferably 430° C. or less. Addition of such a nitride layer to the bearing material can prevent adhesion, decrease friction and significantly improve fretting damage. In this case, the use of a general bearing material such as SUJ2 having no secondary hardenability extremely softens a substrate under the nitride layer after nitriding, and the application of pressure or weight to the bearing induces plastic deformation, which causes deterioration of acoustic characteristics. Accordingly, the material is required to have the secondary hardenability, and preferably, it has a hardness of 57 or more in HRC. More preferably, the size of carbide particles dispersed therein is as very fine as 2 µm or less. Particularly preferred is a martensitic stainless steel containing 0.45% by weight or less of C, 0.05% to 0.50% by weight (preferably, 0.05% to 0.20% by weight in terms of cost) of N, 12.0% to 13.5% by weight of Cr, 0.1% to 0.8% by weight of Mn, 0.1% to 1.0% by weight of Si, optionally, 3.0% by weight or less (preferably, 0.5% by weight or less) of Mo, and Fe and inevitable components as the balance, wherein C+N is 0.5% by weight or more is preferably used.

The rolling bearings used in information instruments are closely controlled particularly in accuracy, so that an increase in nitriding temperature damages the surface roughness and roundness, resulting in inapplicability. Accordingly, the nitriding temperature is preferably 480° C. or less, and more preferably 430° C. or less.

The bearings are usually worked to a desired shape by cutting work, assembled through the steps of heat treatment, cutting work and finishing, and shipped. The secondary hardening treatment (high-temperature tempering) is conducted at a temperature (450° C. to 480° C.) higher than that in nitriding after hardening, followed by nitriding. In some cases, the bearings are cut and ground after the tempering and the secondary hardening treatment, and nitrided after final finishing.

When the interface of the nitride layer and the substrate becomes deeper than the maximum shear stress depth, cracks are sometimes developed in the interface or the nitride layer by impact load or excess pressurization during transportation to damage the bearing. Accordingly, the depth of the nitride layer is 2% or less of a rolling element diameter Da, and the substrate is formed of a secondary hardened steel having a hardness of 57 or more in HRC which is high in toughness and resistible to rolling fatigue. The increased depth of nitride layer not only increases cost by long-term treatment, but also tends to cause deterioration of the surface roughness or the roundness, which brings about the possibility of arising an unfavorable problem in its production.

In this embodiment, by the use of ceramic balls as the rolling elements, adhesion can be further restrained and fretting damage tends to be reduced. It is therefore preferred that the ceramic balls are used as the rolling elements, if permissible in cost.

Fourth Embodiment

The present inventors have conducted intensive investigation to develop the high-functional inexpensive rolling bearing for information instruments by improving material composition. A fourth embodiment of the rolling bearing according to the present invention attaining the above-mentioned objects has a plurality of rolling members each comprising an outer race, an inner race or a shaft element, and a plurality of rolling elements disposed between the outer race and the inner race or the shaft element, wherein at least one of the rolling members is formed of a martensitic stainless steel excellent in silence and resistance to corrosion which contains 0.30% to 0.45% by weight of C, 10.5% to 13.5% by weight of Cr, 0.1% to 0.8% by weight of Mn, 0.1% to 1.0% by weight of Si, 0.05% to 0.19% by weight of N, and Fe and inevitable components as the balance, wherein C+N is 0.5% by weight or more (steel III of the invention).

Preferred examples of the rolling bearings of this embodiment include one formed of a material containing a carbide having a particle size of 2.0 $\mu$m or less and an area fraction of 5% or less to ensure the silence and the resistance to corrosion.

More preferred examples of the rolling bearings of this embodiment include a rolling bearing in which the content of O is 20 ppm or less, or the total content of Ti+0.1 Al is 50 ppm or less, and particularly preferred examples thereof include a rolling bearing in which the content of S is 100 ppm or less.

Fifth Embodiment

The present inventors have conducted intensive investigation for further improvement to develop the material for rolling bearings which is excellent in functions such as acoustic performance and inexpensive. Further, taking into account the fact that the resistance to corrosion is ensured with grease enclosed into the bearings, the present inventors have studied to constitute the races by the above-mentioned steel III of the invention, and the rolling elements by balls made of inexpensive high carbon bearing steels. The studies have revealed that the use of high-accuracy high carbon bearing steel balls as the rolling elements gradually lowers the surface accuracy of the balls during rotational use thereof to deteriorate the acoustic performance, resulting failure to obtain sufficient durability, because of presence of hard and coarse $M_7C_3$ type or $M_{23}C_6$ type carbide particles, if the races are formed of the conventional 13Cr martensitic stainless steels. In contrast, the use of the steel V of the invention in the races restrains a reduction in the accuracy of the races to provide very good durability compared with the conventional steels, since the carbide and the nitride contained therein are very fine, and nitrogen enhances a friction decreasing effect of a passive state membrane.

A fifth embodiment of the rolling bearing according to the present invention attaining the above-mentioned objects is a rolling bearing excellent in acoustic performance having a plurality of rolling members each comprising an outer race, an inner race or a shaft element, and a plurality of rolling elements disposed between the outer race and the inner race or the shaft element, wherein at least one of the rolling members except the rolling elements is formed of a martensitic stainless steel excellent in silence and resistance to corrosion which contains 0.30% to 0.45% by weight of C, 10.5% to 13.5% by weight of Cr, 0.1% to 0.8% by weight of Mn, 0.1% to 1.0% by weight of Si, 0.05% to 0.19% by weight of N, and Fe and inevitable components as the balance, wherein C+N is 0.5% by weight or more (Steel III of the invention), and the rolling elements are formed of the specific high carbon steel of the above (4).

Preferred examples of the rolling bearings of this embodiment include one formed of a material containing a carbide having a particle size of 2.0 $\mu$m or less and an area fraction of 5% or less to ensure the silence and the resistance to corrosion.

More preferred examples of the rolling bearings of this embodiment include a rolling bearing in which the stainless steel used in at least one of the outer race and the inner race or the shaft and the high carbon bearing steel used in the rolling elements contain 20 ppm or less of O, or 50 ppm or less of Ti+0.1 Al.

Case of Linear Guide Bearing Apparatuses and Ball Screw Apparatuses (Sixth Embodiment)

The present inventors have discovered that a reduction in carbon content and addition of nitrogen instead thereof allows a coarse hard eutectic carbide to disappear to form a fine spherical carbide-nitride, that the restriction of the content of Si, Mn, Cr, Mo and V within a certain threshold range can inhibit an increase in hardness after annealing, reduce resistance to deformation drastically, greatly improve the cold workability to provide a high-functional inexpensive stainless steel bearing, and makes it possible to use it in parts having deformed cross sectional form, such as sliders and guides of linear guide devices, that the depth of the hardened layer can be easily obtained by induction hardening for a short period of time because the carbide and the nitride are fine and homogeneous, and variations in heat-treated quality can be reduced, and that the resistance to corrosion and the fatigue strength better than those of the conventional steels such as SUS 440C and 13Cr high carbon martensitic stainless steels can be obtained, whichever the hardening method may be, vacuum hardening or induction hardening.

The linear guide bearing apparatus attaining the above-mentioned objects has a plurality of rolling members each comprising a guide rail, a slider and a plurality of rolling elements, or the ball screw apparatus attaining the above-mentioned objects has a plurality of rolling members each comprising a screw shaft, a nut and a plurality of rolling elements, wherein at least one of the rolling elements is formed of the above-mentioned stainless steel (I). In particular, C+N is preferably 0.7% by weight or less in the above-mentioned stainless steel (I).

In the linear guide bearing apparatus comprising the guide rail, the slider and the plurality of rolling elements, or the ball screw apparatus comprising the screw shaft, the nut and the plurality of rolling elements, at least one of the constituent parts having deformed cross sectional form such as the rail and the slider is formed of a mixed structure of the fine carbide or nitride and ferrite after tempering, and further, the hardened layer is formed only as the surface layer or the rolling parts by induction hardening after cold deformed drawing to a form near to the desired form of a finished article. The surface layer as used herein means within 2% of the diameter of the rolling element.

According to this embodiment, with respect to the stainless steel which is a constituent material thereof, carbon, which adversely affects the resistance to corrosion and forms a coarse eutectic carbide to deteriorate the functions, when its content is large, is partly substituted by nitrogen having solid solution strengthening action at a level similar to that of carbon to restrict the carbon concentration within a definite range, thereby inhibiting formation of the coarse eutectic carbide. Thus, the stainless steel excellent in resistance to corrosion and rolling fatigue can be obtained, and the workability and the heat treatment productivity are improved by optimizing the content of other alloy components. As a result, the high-functional linear bearing apparatus can be produced at low cost.

Further, this embodiment is remarkably more excellent in cold workability, and in rolling fatigue strength characteristics and resistance to corrosion after heat treatment than the conventional steels, so. that it can be easily applied to pipes, coils and bar steels for bearings which are cold-worked, regardless of deformed drawing.

Furthermore, the rolling apparatus of this embodiment is excellent in resistance to fretting, and can be suitably used in devices accompanied by repeated reciprocating motion at short stroke such as ball screws and linear guides for table apparatuses.

Preferably, the rolling elements are formed of high carbon Cr martensitic stainless steels, as embodiment 1 according to the rolling bearing described above. For example, the rail slider and the rail may be formed of the steel I of the invention and the rolling elements may be formed of the high Cr martensitic stainless steel, for the linear guide, and the nut and the screw shaft may be formed of the steel I of the invention and the rolling elements may be formed of the high Cr martensitic stainless steel, for the ball screw apparatus.

Case of Ones Used under Severe Conditions Such As Corrosive Conditions (Common to Rolling Members Including Rolling Bearings, Linear Guide Bearing Apparatuses and Ball Screw Apparatuses) Seventh Embodiment As described above, in Japanese Patent Application No. 7-271111, the present inventors have found out the relationship between the concentrations of C and Cr which forms no coarse carbide, further have attained low cost by addition of nitrogen within a range keeping the soundness of the materials, and have further enhanced the functions of the conventional stainless steels. In order to further enhance the functions, the present inventors have conducted intensive investigation. As a result, the present inventors have discovered a material structure having very excellent resistance to corrosion without formation of a coarse eutectic carbide and δ-ferrite which are harmful to the rolling fatigue strength.

The rolling bearing or the rolling apparatus attaining the above-mentioned objects comprises an outer member, an inner member and a plurality of rolling elements disposed therebetween, wherein at least one of the outer member, the inner member and the rolling elements is formed of a martensitic stainless steel containing 0.45% by weight or less of C, 15% to 20% by weight of Cr, 0.1% to 0.8% by weight of Mn, 0.1% to 1.0% by weight of Si, 0.05% to less than 0.2% by weight of N, 0.5% to 3.0% by weight of Mo, 1.5% by weight or less of Ni, 2.0% by weight or less of Cu, and Fe and inevitable components as the balance, wherein the relationship between the content of C and that of Cr satisfies C %≦−0.05 Cr %+1.41; the relationship between a specific relational equation eq1 indicating the content of elements accelerating the conversion of the raw material to ferrite, taken as (eq1)=Cr %+Si %+1.5 Mo %, and a specific relational equation eq2 indicating the content of elements accelerating the conversion of the raw material to austenite, taken as (eq2)=C %+0.83 N %+0.12 Mn %+0.05 Ni %+0.02 Cu %, satisfies (eq2)≧0.04×(eq1)−0.39; the total content of C and N satisfies C+N≧0.4% (steel I of the invention); and the pitting index PI value satisfies PI=Cr %+3.3 Mo %+30 N %−45 C %≧10.0 (steel IV of the invention).

Eighth Embodiment

As described above, the present inventors have further enhanced the functions of the conventional stainless steels at low cost in Japanese Patent Application No. 7-271111, and have further conducted investigation to improve the resistance to corrosion and high-temperature life. As a result, the present inventors have developed the rolling bearing having high core toughness, having both the resistance to corrosion and the high-temperature life, and suitably usable for aircraft, particularly for jet engines and gas turbines used under conditions of high temperature and high speed as described in JP-A-9-287058.

In this invention, however, it is also necessary to nitride the material before hardening after cutting to a form near to the desired form of a finished article, which causes an increase in cost as compared with a material of through hardening. Further, in precision products such as ball screws, round bars are sometimes grooved by a technique called solid grinding after hardening. In this case, grinding allowance is very largely taken under rolling surfaces, so that the surface hardening type is difficult to be obtained. Accordingly, the development of inexpensive through hardening type stainless steels for bearings excellent in resistance to corrosion and high-temperature life has been desired.

Then, the present inventors have conducted intensive investigation to further enhance the functions, and invented the stainless steel for bearings having very excellent resistance to corrosion and high-temperature life without formation of a coarse eutectic carbide and δ-ferrite which are harmful to the rolling fatigue strength.

The rolling bearing or the rolling apparatus attaining the above-mentioned objects comprises an outer member, an inner member and a plurality of rolling elements disposed therebetween, the rolling elements rolling in contact with a first contact surface of the outer member and a second contact surface of the inner member facing thereto, wherein at least one of the outer member, the inner member and the rolling elements is formed of a martensitic stainless steel containing 0.45% by weight or less of C, 15% to 20% by weight of Cr, 0.1% to 0.8% by weight of Mn, 0.1% to 1.0% by weight of Si, 0.05% to less than 0.2% by weight of N, 0.5% to 3.0% by weight of Mo, 1.5% by weight or less of Ni, 2.0% by weight or less of Cu, 1.0% to 7.0% by weight of Co, 1.0% by weight or less of V, and Fe and inevitable components as the balance, wherein Mo+V is 0.8% to 4.0% by weight; Co+Ni is 2.0% to 8.0% by weight; the relationship between the content of C and that of Cr satisfies C %≦−0.05 Cr %+1.41; the relationship between a specific relational equation eq1 indicating the content of elements accelerating the conversion of the raw material to ferrite, taken as (eq1)=Cr %+Si %+1.5 Mo %+3.5 V %, and a specific relational equation eq2 indicating the content of elements accelerating the conversion of the raw material to austenite, taken as (eq2)=C %+0.83 N %+0.12 Mn %+0.05 (Ni+Co)+0.02 Cu %, satisfies (eq2)≧0.04×(eq1)−0.39 and (eq2)≦0.8; the total content of C and N satisfies C+N≧0.4%; and the pitting index PI value satisfies PI=Cr %+3.3 Mo %+30 N %−45 C %≧10.0 (steel V of the invention).

Description of Functions and Content of Respective Element

When Steel I of the Invention (Martensitic Stainless Steel) Is Used (First and Sixth Embodiments)

The critical meanings of the respective components of the steel I of the invention are as follows:

C

C is an element enhancing the hardness after hardening and tempering by conversion of a substrate to martensite to increase the strength, and the less amount thereof is better in terms of the resistance to corrosion. If a large amount of C is added, Cr forms coarse eutectic carbides in steel production. As a result, the insufficient Cr concentration in the substrate not only results in failure to obtain the sufficient resistance to corrosion, but also deteriorates the fatigue strength, the toughness and the workability. Accordingly, the carbon content is adjusted to 0.6% by weight or less. However, from the viewpoints of the resistance to corrosion and the workability, the carbon content is preferably adjusted to 0.5% by weight or less, and more preferably to 0.45% by weight or less.

Cr

Cr is an element most necessary for giving the resistance to corrosion to the steel. However, less than 10.0% by weight results in failure to obtain the sufficient resistance to corrosion. An increase in Cr content improves the resistance to corrosion, but addition of Cr in excess is liable to form δ-ferrite or an eutectic carbide, resulting in deterioration of the toughness or the fatigue strength and the workability. The Cr content is therefore 14% by weight or less, and preferably from 11.5% to 13.5% by weight. ps Mn Mn is an element necessary as a deoxidizer in steel production, and added in an amount of 0.1% by weight or more. However, addition of a large amount of Mn deteriorates not only the cold workability and the machinability, but also the resistance to corrosion by coexistence together with impurities such as S and P. In some cases, the amount of residual austenite is increased to result in failure to obtain the sufficient hardening hardness. The Mn amount is therefore adjusted to 0.8% by weight or less, and preferably to 0.5% by weight or less.

Si

Si is required to be contained in an amount of 0.1% by weight or more as a deoxidizer in steel production. Further, Si is an element effective for enhancing the resisting property for temper softening and improving the rolling fatigue strength, but addition of a large amount thereof deteriorates the toughness and the cold workability, and enhances formation of δ-ferrite. The Si content is therefore adjusted to 1.0% by weight or less.

Mo

Mo has the function of extremely increasing the hardenability and the resisting property for temper softening, and also effectively acts on the resistance to corrosion. However, addition of excessive Mo increases not only the toughness, but also the hardness after annealing. As a result, the cold workability and the machinability are deteriorated to cause an increase not only in material cost, but also in production cost of the bearing. The Mo content is therefore adjusted to 0.5% by weight or less.

V

V is a strong element for producing a carbide and a nitride, significantly enhances the strength, and tends to effectively act on the resistance to corrosion. However, addition of a large amount of V increases not only the toughness, but also the hardness after annealing. As a result, the cold workability and the machinability are deteriorated to cause an increase not only in material cost, but also in production cost of the bearing. The V content is therefore adjusted to 0.2% by weight or less.

N

N has the function of strengthening martensite to improve the resistance to corrosion and the wear resistance, similarly to C, and also has the function of inhibiting formation of coarse eutectic carbides. Accordingly, N is preferably added in an amount of 0.05% by weight or more.

In general, the solubility of N in molten steel and pro-eutectic ferrite is low in the course of steel production under usual atmospheric conditions, so that it is very difficult to add 0.2% by weight or more of nitrogen in the components of the steel of the invention. Further, addition of a large amount of nitrogen induces the development of bubbles in the course of solidification to introduce a large number of pores into an ingot, resulting in damage of the soundness of the material.

Steel production under a high pressure nitrogen atmosphere makes it possible to add 0.2% by weight or more of nitrogen. In this case, however, the huge cost of equipment becomes necessary, resulting in increased cost.

For the above-mentioned reason, the content of nitrogen is adjusted to 0.2% by weight or less. Nitrogen is also an element for stabilizing austenite, and the amount of residual austenite is sometimes increased to reduce the hardness after hardening, (particularly in overheating in induction hardening on the linear guide bearing). Accordingly, the nitrogen content is preferably adjusted to 0.18% by weight or less, and more preferably to 0.14% by weight or less.

C+N

In order to obtain a surface hardness of 58 or more in HRC and sufficient wear resistance after hardening and tempering, C+N is required to be 0.45% by weight or more. If the total content of carbon and nitrogen is too much, the cold workability is deteriorated (particularly, in the case of the linear guide bearing, the hardness after tempering is increased or work-hardened). Accordingly, C+N is preferably adjusted to 0.7% by weight or less.

Relational Equations

In the present invention, taken as (eq1)=Cr %+Si %+1.5 Mo %+3.5 V % and (eq2)=C %+0.83 N %+0.12 Mn %, the mutual relationship between both the equations satisfies (eq2)≧0.04×(eq1)−0.39, (eq1)≦14.0 and (eq2)≦0.8.

The respective elements of C, N and Mn are elements for stabilizing austenite. On the other hand, the respective elements of Cr, Si Mo and V are elements for stabilizing ferrite.

When the above-mentioned equation (eq2)≧0.04×(eq1)−0.39 is not satisfied, δ-ferrite harmful to the toughness is formed in some cases. Further, when (eq1)≦14.0 and (eq2)≦0.8 are not satisfied, the hardness after annealing is increased, resulting in failure to obtain good workability, and stabilization of residual austenite reduces the hardness to fail to attain a long life. The equation is preferably eq2≦0.7.

If the upper limit of the carbon concentration is not limited by C % ≦−0.05 Cr %+1.41, a coarse eutectic carbide is produced to deteriorate the acoustic characteristics, the fatigue strength and the toughness. Even if C %≦−0.05 Cr %+1.41, the eutectic carbide is often coarsened to about 5 μm to about 20 μm or more by the influence of solidification velocity in steel production. However, the stainless steel used in the rolling bearing of the present invention contains nitrogen having the function of inhibiting coarsening of the eutectic carbide, so that formation of the coarse eutectic carbide can be inhibited as long as C %≦−0.05 Cr %+1.41 is satisfied.

For the above-mentioned reason, the steel I of the invention has a mixed structure of fine carbide, nitride and ferrite particles having a size of 10 μm or less after annealing, and the content of C+N and other alloy components are optimized. Accordingly, this steel can be more reduced in material hardness and work hardenability than SUS 440C and 13Cr martensitic stainless steels, the conventional steels, so that it is excellent particularly in cold workability, particularly in the case of the linear guide or ball screw apparatus. The sufficient hardened layer can therefore be easily obtained by induction hardening, and variations in heat treatment quality can also be depressed, resulting in the improvement of reliability of the apparatus.

Although the inner race, the outer race and the rolling elements may be formed of the steel I of the invention described above, a further preferred effect is obtained by using the high carbon Cr martensitic stainless steel in the rolling elements as described below.

Use of High Carbon Cr Martensitic Stainless Steel in Rolling Elements

A bearing formed of a conventional high carbon Cr martensitic stainless steel as a single material is inferior to a bearing made of a bearing steel in accuracy, and causes the mutual interference of carbide particles at their contact surfaces in rotational operation, resulting in failure to obtain sufficient acoustic performance and fatigue strength.

Further, such a stainless steel is poor in mechanical strength and workability, so that it is unsuitable particularly for application to the inner race and the outer race. The steel I of the invention has the fine carbide and is sufficient in mechanical strength and workability, so that it is suitable particularly for application to the inner race and the outer race. Accordingly, when a bearing is constituted, using the steel I of the invention as a material on the race side and the high carbon Cr martensitic stainless steel as a material on the rolling element side, the mutual interference of coarse carbide particles can be inhibited to provide a ball bearing improved in acoustic performance and fatigue strength, and sufficient in mechanical strength.

Further, the high carbon Cr martensitic stainless steels contain hard carbides such as $M_7C_3$ and $M_{23}C_6$ in large amounts, and have good wear resistance, because these carbides have non-metallic properties, the area of metal-metal contact is relatively decreased, and passive state membranes formed on surfaces of the stainless steels have a wear reducing effect. They also have the function of significantly inhibiting the damage and wear of the opposite members. In order to obtain a preferred effect, the area fraction of the carbides is preferably 3% or more. When the amount of the carbides is too much, the crushing strength of the rolling elements is significantly reduced to cause the possibility of breakage. Accordingly, the upper limit thereof is 20% or less.

For the above-mentioned reason, when the bearing is constituted, using the steel I of the invention in the opposite members and the high carbon Cr martensitic stainless steel in the rolling elements, a more preferred effect is obtained.

When Steel III of the Invention Is Used (Fourth and Fifth Embodiments

The functions of the alloy components, the reasons for restricting the ranges of the components and other critical meanings of the steel III of the invention are as follows:

(C)

The reason for restricting the range of the C content is the same as with the steel I of the invention, and particularly, for obtaining the hardness and a fine carbide required as bearings for various spindles, various spindle motors and HDD drives, the carbon content is from 0.30% to 0.45% by weight, and preferably from 0.40% to 0.45% by weight.

(Cr)

The reason for restricting the range of the Cr content is also the same as with the steel I of the invention, and the content thereof is preferably from 10.5% to 13.5% by weight, and more preferably from 12.0% to 13.5% by weight.

(Mn and Si)

The reason is the same as with the steel I of the invention.

(N)

The reason for restricting the content is the same as with the steel I of the invention, and the nitrogen content is adjusted to 0.19% by weight or less. Further, nitrogen is an element for stabilizing austenite, so that the amount of residual austenite is increased to deteriorate the impact resistance in some cases. The nitrogen content is therefore adjusted to preferably 0.16% by weight or less, and more preferably 0.14% by weight or less.

(C+N)

C and N are elements which are dissolved in martensite or form a carbide or a nitride to obtain the hardness and the resistance to fretting necessary for the bearing, and a total amount of 0.5% by weight or more is required.

(O and Ti+0.1 Al)

The above-mentioned coarse eutectic carbide and a hard non-metallic inclusion adversely affect the acoustic performance of the rolling bearing. O (oxygen) contained in the steel combines with Al or the like, an inevitable component, to form an alumina inclusion, which remains in many cases. The alumina inclusion is relatively easily coarsened, so that it sometimes adversely affects the acoustic performance. Accordingly, oxygen is restricted to 20 ppm or less, preferably to 10 ppm or less. Further, Al or Ti combines with N, and remains as very hard AlN or TiN, which adversely affects the acoustic performance, similarly to the alumina inclusion. Accordingly, Ti+0.1 Al is restricted to 50 ppm or less as the total amount.

(S)

S is an element harmful to the resistance to corrosion, so that it is preferred that its content is as small as possible. In order to exhibit the effect sufficiently, the S content is preferably adjusted to 100 ppm or less. However, the stainless steel is inferior to SUJ2 in machinability, and a reduction in S content not only deteriorates the machinability, but also increases material cost by excessive purification. Accordingly, the excessive purification is not conducted.

Carbide Contained Has a Particle Size of 2.0 μm or Less and an Area Fraction of 5% or Less In order to obtain good acoustic performance, the particle size of the carbide contained is adjusted to 2.0 μm or less, and the area fraction thereof to 5% or less.

When the Above-Mentioned Specific High Carbon Steel Is Used

The critical meanings of the respective elements of the specific high carbon steel of the above (4) used in the second and fifth embodiments are as follows:

(C)

Carbon is an element effective for obtaining the hardness necessary for the bearing. When the resistance to corrosion is not required, considering that the heat treatment mainly comprising hardening and tempering low in cost is employed, addition of 0.8% or more of carbon is effective for obtaining the long life and the wear resistance. However, exceeding 1.5% by weight results in the development of a coarse carbide, which necessitates long-term soaking and deteriorates the workability to cause an increase in cost conversely. For the above-mentioned reason, the carbon content of the material is adjusted to 0.8% to 1.5% by weight. From the viewpoint of the workability, it is adjusted to 0.9% by weight or less for decreasing material cost.

(Cr)

Cr has the functions of enhancing the hardenability and the resisting property for temper softening, forming a carbide to inhibit coarsening of crystal grains in heat treatment, and giving the wear resistance. However, exceeding 2.0% by weight results in necessity of long-term soaking or deterioration of the workability to cause an increase in material cost, as well as in Cr addition cost. For the above-mentioned reason, the amount of Cr contained in the material is adjusted to 0.1% to 2.0% by weight. From the viewpoint of the workability, it is further preferably adjusted to 0.6% by weight or less for reducing material cost.

(Mn)

Mn is an element necessary as a deoxidizer in steel production, and added in an amount of 0.1% by weight or more. However, addition of a large amount thereof not only deteriorates the machinability, but also occasionally increases the amount of residual austenite, resulting in failure to obtain the sufficient hardening hardness. Accordingly, the Mn content is adjusted to 0.1% (particularly, 0.5% by weight when the amount of Cr is adjusted to 0.6% by weight or less) to 1.5% by weight, and preferably to 1.1% by weight or less.

(Si)

Si is required to be contained in an amount of 0.1% by weight or more as a deoxidizer in steel production, similarly to Mn. Further, Si is an element effective for enhancing the resisting property for temper softening and improving the rolling fatigue strength, but addition of a large amount thereof deteriorates the machinability. The Si content is therefore adjusted to 1.0% by weight or less. From the viewpoint of the workability, it is preferably adjusted to 0.7% by weight or less for reducing material cost.

Then, the reason why the opposite member combined with the above-mentioned rolling element formed of the above-mentioned specific high carbon steel is formed of the high carbon Cr martensitic stainless steel in the second embodiment is as follows:

(High Cr Martensitic Stainless Steel)

When the high carbon steel and the high Cr martensitic stainless steel are each evaluated in resistance to fretting as a single material, the stainless steel is extremely better than the high carbon steel. However, the fretting damage of the high carbon steel is inhibited and significantly improved by a combination thereof.

In contrast, the stainless steel tends to suffer from fretting damage rather than when evaluated as the single material. The use of the stainless steel which is hard of working in the race results in not only a little cost reduction effect, but also failure to sufficiently exhibit the inherent characteristics of the stainless steel.

A problem encountered in the rolling bearing for HDD swing arms is the fretting damage of the race. It is therefore preferred that the low cost high carbon steel is used in the race and the stainless steel in the rolling elements for exhibiting sufficient effects with respect to cost and functions. The stainless steel is inferior to the high carbon steel in workability, but can be mostly formed to the rolling elements (balls) by forging, compared with the relatively manpower-consuming race. Accordingly, the use of the stainless steel does not become a problem so much.

Further, the use of the high carbon steel in the race as described above improves the roughness accuracy, eliminates the mutual interference of carbide particles at their contact surfaces, and improves the acoustic performance. Furthermore, the high carbon steel such as the bearing steel is somewhat higher in hardness than the stainless steel, so that the internal friction can be reduced, and the use of the stainless steel in the rolling elements decreases the specific gravity of the rolling elements. Accordingly, the track-rotational torque tends to be a little decreased. This can be therefore suitably used, not necessarily in bearings for various spindles, various spindle motors and swing arms for HDD drives.

(N)

N is preferably added in an amount of 0.05% to 0.2% by weight. In addition to the reason of the first object, particularly when the race or the shaft which is the opposite member is formed of the above-mentioned carbon steel, nitrogen is alloyed in the stainless steel, whereby a transferred membrane is liable to be formed on the surface of the carbon steel, the opposite member in contact therewith, which achieves a profound effect on a reduction in fretting damage. For the above-mentioned reason, N is added in an amount of 0.05% by weight or more.

When Steel IV of the Invention Is Used (Seventh Embodiment)

The critical meanings of the content of the respective elements of the steel IV of the invention are as follows:

(C)

C is an element enhancing the hardness after hardening and tempering by conversion of a substrate to martensite to increase the strength, and the less amount thereof is better in terms of the resistance to corrosion. If a large amount of C is added, C forms coarse eutectic carbides with carbide-forming elements such as Cr and Mo in steel production to significantly deteriorate the resistance to corrosion and the fatigue strength. Accordingly, the carbon content is adjusted to 0.45% by weight or less. Further, from the viewpoint of the resistance to corrosion, the carbon content is preferably adjusted to 0.4% by weight or less.

(Cr)

Cr is an element most necessary for giving the resistance to corrosion to the steel, and when the resistance to corrosion is particularly regarded as important, 15.0% by weight or more of Cr is necessary for remarkably exhibiting its effect. Further, addition of Cr in excess forms δ-ferrite which causes embrittlement and coarsens the carbide depending on the carbon content, which rather causes deterioration of the resistance to corrosion in some cases. Accordingly, the upper limit of the Cr content is 20% by weight, and the Cr content is preferably adjusted to 17% to 19% by weight.

(Mn)

Mn is an element necessary as a deoxidizer in steel production, and added in an amount of 0.1% by weight or more. However, addition of a large amount thereof occasionally results in the tendency to form residual austenite, thus failing to obtain the sufficient hardening hardness. Accordingly, the upper limit of the Mn content is adjusted to 0.8% by weight, and the Mn content is preferably adjusted to 0.5% by weight or less.

(Si)

The reason is the same as with the steel I of the invention.

(N)

N has the function of strengthening martensite to enhance the hardening hardness and further to improve the resistance to corrosion, similarly to C, and also has the function of inhibiting formation of primary coarse eutectic carbides. Accordingly, N is preferably added in an amount of 0.05% by weight or more, preferably 0.08% by weight or more. However, addition of a large amount of nitrogen induces the development of bubbles because the solubility of pro-eutectic ferrite crystallized in the course of solidification is low in usual dissolution. As a result, a large number of pores are introduced into an ingot, resulting in damage of the soundness of the material. It is also possible to add a large amount of nitrogen by the steel production method under a high pressure nitrogen atmosphere or the surface immersion method without damage of the soundness of the material. In this case, however, material cost or heat treatment cost rises. From the above, usual dissolution is preferably employed in terms of cost, and the nitrogen content is adjusted to 0.2% by weight or less, and preferably to 0.18% by weight or less.

(Mo)

Mo has the function of extremely increasing the hardenability and the resisting property for temper softening, and also has the function of improving the resistance to pitting. Accordingly, Mo is added in an amount of 0.5% by weight or more. However, addition thereof in excess deteriorates the toughness and the workability. The upper limit is therefore 3.0% by weight.

(Ni)

Ni is a strong element for stabilizing austenite, and has the functions of inhibiting formation of δ-ferrite, improving the toughness, and further improving the resistance to corrosion, so that it is selectively added preferably in an amount of 0.1% by weight or more. However, addition thereof in excess causes formation of a large amount of residual austenite, resulting in failure to obtain sufficient hardening hardness in some cases. The upper limit is therefore 1.5% by weight.

(Cu)

Cu is also an element for stabilizing austenite, similarly to Ni, and has the functions of inhibiting formation of δ-ferrite and improving the resistance to corrosion. It is therefore added preferably in an amount of 0.1% by weight or more. However, addition of a large amount thereof occasionally causes the development of hot cracks in the hot forging step necessary in the course of bearing production, and results in failure to obtain sufficient hardening hardness. The upper limit is therefore 2.0% by weight.

(Inevitable Components)

Usually, the steel contains impurities such as P, S and O, in addition to the above-mentioned elements. In the present invention, the excessive purification is not conducted in respect to cost. In particular, S and P are segregated, or deteriorate the resistance to corrosion when they are contained in large amounts. Accordingly, it is preferred that they are contained as impurities in the steel in as small amounts as possible. The content thereof is therefore preferably 0.03% or less. Further, O forms an oxide inclusion to deteriorate the fatigue strength, so that it is preferred that it is contained as an impurity in the steel in as small an amount as possible. The content thereof is therefore preferably 50 ppm or less.

(C %≦−0.05 Cr %+1.41)

When the above equation is not satisfied, coarse eutectic carbides are formed to cause not only deterioration of the rolling fatigue strength, but also significant deterioration of the resistance to corrosion.

((eq2)≧0.04×(eq1)−0.39, (eq1)=Cr %+Si %+1.5 Mo %, and (eq2)=C %+0.83 N %+0.12 Mn %+0.05 Ni %+0.02 Cu %)

Elements described in eq1, namely Cr, Si and Mo, are each elements for stabilizing ferrite, and elements described in eq2, namely C, N, Mn, Ni and Cu, are each elements for stabilizing austenite. Accordingly, in a component system not satisfying the above-mentioned inequalities, ferrite is stabilized to produce δ-ferrite harmful to the toughness in some cases.

(C+N≧0.4%)

C+N is required to be a minimum of 0.4% by weight for obtaining the hardness necessary for the bearing by martensite strengthening and precipitation hardening, and preferably to be 0.45% by weight or more.

(Pitting Index PI Value=Cr %+3.3 Mo %+30 N %−45 C %≧10.0)

In general, the resistance to corrosion of a stainless steel is evaluated by the salt water spray test or the pitting potential measurement in many cases. The salt water spray test is the simplest evaluation method, but a method unsuitable for quant flying to what extent there is a difference in resistance to corrosion. When the resistance to corrosion is desired to be quantitatively evaluated, pitting potential Vc' is measured by the polarization measurement for comparison evaluation in many cases. The larger pitting potential indicates the better resistance to corrosion, and further, in an austenitic stainless steel, the pitting potential is said to correlate with a relational equation, pitting index PI=aCr %+bMo %+cN %. That is to say, this equation shows that the larger content of Cr, Mo and N gives the better resistance to corrosion, and the concept of the pitting index is often used in component design of an austenitic or ferritic stainless steel. However, this conventional pitting index can be applied only to an austenitic or ferritic stainless steel containing no substantial carbon, but can not be applied to a martensitic stainless steel containing carbon. Then, the present inventions have conducted intensive investigation to examine the influence of carbon on the resistance to corrosion. As a result, the present inventors have derived that the pitting potential closely correlates with PI=Cr %+3.3 Mo %+30 N %−45 C %, as long as C is within the composition range satisfying C %≦−0.05 Cr %+1.41.

The present inventors have discovered that in the case of not containing coarse eutectic carbides, there is a good correlation between the above PI value and pitting potential Vc' (100) representing the resistance to corrosion of the steel, and that very high resistance to corrosion is obtained by ensuring a PI value of 10 or more. For the above-mentioned reason, the above-mentioned PI value is adjusted to 10.0 or more in the present invention.

When Steel V of the Invention Is Used (Eighth Embodiment)

The critical meanings of the content of the respective elements of the steel V of the invention are as follows: (C), (Cr), (Mn), (Si), (N), (Mo), (Ni), (Cu), (Inevitable Components), (Relation between C and Cr), (C+N) and (PI Value) are the same as with the steel IV of the invention.

(Co)

Co is also an element for stabilizing austenite, similarly to Ni, and has the functions of inhibiting formation of δ-ferrite and improving the resisting property for temper softening and the high-temperature hardness by solid solution strengthening of the substrate and coagulation inhibition of the carbides. It is therefore added in an amount of 1.0% by weight or more. However, addition of a large amount thereof deteriorates the workability, and significantly increases material cost. The upper limit is therefore adjusted to 7.0% by weight.

(V)

V is a strong element for producing a carbide and a nitride, and finely precipitates in the steel to contribute to solid solution strengthening. In particular, when tempered at high temperatures, it has the function of acting on secondary hardening to enhance the ordinary-temperature hardness. It is therefore selectively added in an amount of up to 1.0% by weight. However, addition thereof in large amounts exceeding 1.0% by weight causes coarsening of the carbides in the course of solidification, or significantly deteriorates the workability such as the machinability.

((eq2)≧0.04×(eq1)−0.39, (eq1)=Cr %+Si %+1.5 Mo %+3.5 V %, (eq2)=C %+0.83 N %+0.12 Mn %+0.05 (Ni+Co)+0.02 Cu % and (eq2)≦0.8)

Elements described in eq1, namely Cr, Si, Mo and V, are each elements for stabilizing ferrite, and elements described in eq2, namely C, N, Mn, Ni, Co and Cu, are each elements for stabilizing austenite. Accordingly, in a component system not satisfying the above-mentioned inequalities, ferrite is stabilized to produce δ-ferrite harmful to the toughness in some cases. Further, when eq2 is 0.8 or more, austenite is stabilized to result in failure to obtain sufficient hardening hardness in some cases.

EXAMPLES

Example I

This example corresponds to the above-mentioned first embodiment.

Materials to be subjected to tests of the invention and steels for comparison were prepared as shown in Table 1.

The workability was evaluated by the cutting test, the drilling test and the grinding test, and results thereof are shown in Table 2. These test conditions are shown below. In respect to heat treatment conditions, the heating temperature was 1020° C. to 1070° C., and immediately after hardening in a hardening oil at 60° C., subzero treatment was conducted at −80° C. for 1 hour, followed by tempering at 160° C. to 200° C. for 2 hours.

Cutting Test Conditions

Cutting System: Dry

Feed Speed: 0.1 to 0.2 mm/rev

Cutting Depth: 0.5 to 1.0 mm

Cutting Tool: P10 (JIS B 4053)

Cutting Speed: 80 to 100 m/min

Drilling Test Conditions

Drill Tool: φ 8 mm, SKH51

Drilling System: Dry

Drilling Depth: 10 mm

Cutting Speed: 21 m/min (840 rpm)

Thrust: 70 kg

Grinding Test Conditions

Grinder: WA80 (manufactured by Clenoton Co.)

Grinding Fluid: Soluble type

Grinder Speed: 1500 to 2700 m/min

TABLE 1

|  | Symbol | C | Si | Mn | Cr | Mo | V | N | eq1 | eq2 | C + N |
|---|---|---|---|---|---|---|---|---|---|---|---|
| Invention | A | 0.37 | 0.57 | 0.38 | 13.25 | — | — | 0.11 | 13.82 | 0.51 | 0.48 |
|  | B | 0.40 | 0.33 | 0.31 | 13.00 | — | — | 0.18 | 13.33 | 0.59 | 0.58 |
|  | C | 0.50 | 0.30 | 0.28 | 12.87 | 0.42 | — | 0.18 | 13.80 | 0.68 | 0.68 |
|  | D | 0.43 | 0.40 | 0.30 | 12.95 | — | — | 0.14 | 13.35 | 0.58 | 0.57 |
|  | E | 0.33 | 0.50 | 0.52 | 12.30 | — | 0.12 | 0.13 | 13.22 | 0.50 | 0.46 |
|  | F | 0.35 | 0.30 | 0.40 | 13.01 | 0.10 | 0.11 | 0.13 | 13.85 | 0.51 | 0.48 |
| Comparison | G | 0.39 | 1.13 | 0.51 | 13.03 | — | — | 0.13 | 14.16 | 0.56 | 0.52 |
|  | H | 0.35 | 0.50 | 1.10 | 12.99 | — | 0.42 | 0.14 | 14.96 | 0.60 | 0.49 |
|  | I | 0.37 | 0.42 | 0.34 | 12.99 | 0.67 | — | 0.13 | 14.42 | 0.52 | 0.50 |
|  | J | 0.39 | 0.57 | 0.52 | 16.43 | — | — | 0.14 | 17.00 | 0.57 | 0.53 |
|  | K | 0.43 | 0.45 | 0.44 | 13.00 | 0.22 | 0.32 | 0.12 | 14.90 | 0.58 | 0.55 |
|  | L | 0.38 | 0.35 | 0.70 | 13.05 | 0.09 | — | 0.02 | 13.54 | 0.48 | 0.40 |
|  | M | 0.64 | 0.36 | 0.59 | 12.60 | 0.04 | — | — | 13.02 | 0.71 | 0.64 |
|  | N | 1.02 | 0.36 | 0.59 | 17.12 | 0.40 | — | — | 18.08 | 1.09 | 1.02 |
|  | O | 0.36 | 0.80 | 0.30 | 18.12 | 0.40 | 0.96 | 0.10 | 22.88 | 0.48 | 0.46 | eq1 = Cr % + Si % + 1.5 Mo % + 3.5 V %
eq2 = C % + 0.83 N % + 0.12 Mn %

TABLE 2

|  | Symbol | Annealing Hardness (HRB) | Life of Cutting Tool (min) | Time Required for Drilling (sec) | Dressing Skip (Number of Grinding) | Roughness of Finished Surface (μmRa) | Total Evaluation |
|---|---|---|---|---|---|---|---|
| Invention | A | 88.9 | 98 | 14.1 | 29 | 0.04 | ◯ |
|  | B | 89.0 | 88 | 14.7 | 27 | 0.04 | ◯ |
|  | C | 89.5 | 82 | 15.5 | 24 | 0.05 | ◯ |
|  | D | 89.0 | 89 | 14.5 | 28 | 0.04 | ◯ |
|  | E | 89.5 | 83 | 15.3 | 28 | 0.04 | ◯ |
|  | F | 89.4 | 82 | 15.0 | 29 | 0.04 | ◯ |
| Comparison | G | 94.0 | 47 | 19.8 | 20 | 0.05 | Δ (x) |
|  | H | 93.7 | 58 | 18.7 | 24 | 0.04 | Δ |

TABLE 2-continued

| Symbol | Annealing Hardness (HRB) | Life of Cutting Tool (min) | Time Required for Drilling (sec) | Dressing Skip (Number of Grinding) | Roughness of Finished Surface (μmRa) | Total Evaluation |
|---|---|---|---|---|---|---|
| I | 92.8 | 62 | 17.4 | 23 | 0.05 | Δ |
| J | 91.2 | 73 | 17.1 | 21 | 0.05 | Δ |
| K | 93.2 | 62 | 18.6 | 20 | 0.04 | Δ |
| L | 89.0 | 87 | 14.6 | 30 | 0.04 | ○ |
| M | 93.8 | 56 | 18.9 | 20 | 0.08 | Δ |
| N | 95.2 | 44 | 21.3 | 14 | 0.12 | x |

All the steels of the invention contain no coarse eutectic carbides, and as apparent from Table s 1 and 2, they are further restricted in alloy components such as C, Si, Mn, Cr, Mo and V, and minimized in an increase in hardness after annealing. Accordingly, they are good in all the machinability, the grindability and further the roughness after grinding finish which is low. In contrast, the steels for comparison, G, H, I and K, do not satisfy eq1≦14.0, so that the hardness after annealing is relatively increased, resulting in failure to obtain good workability. The steel for comparison N not only is 0.6% or more in C %, but also does not satisfy (eq2)≦0.7 and C %≦-0.05 Cr %+1.41. Coarse carbides are therefore formed to cause poor workability. The steel for comparison O was excluded from the evaluation, because formation of δ-ferrite was observed.

In Table 3, results of the life test, the impact test and the salt water spray test are shown.

The salt water spray test was performed using a 5% solution of NaCl at 35° C. according to JIS Z2371, after complete degreasing of an outer race of a bearing, and judged by observing an external appearance thereof after a test time of 50 hours. The degree of rust development was observed, and evaluated by the three steps of ○, Δ and x from a better to a worse. Results thereof are shown in the table.

Further, the life test was conducted using a thrust type rolling life tester described in *Handbook of Special Steels*, the first edition, pages 10 to 21 (edited by Denki Seiko Kenkyusho, published on May 25, 1969, Rikogakusha) under the following conditions, and the cumulative number of repeated stress cycles (life) up to the time when flaking was developed on each sample was examined to prepare Weibull plots. Then, the L10 life of each sample was determined from each Weibull distribution.

Furthermore, the impact test was test was conducted using a test piece of JIS No. 3 (depth 2 mm, notch: 5RC) at room temperature.

Life Test

Test surface Pressure: 5200 Mpa
Revolution: 3000 C. P. M.
Lubricant: #68 turbine oil

TABLE 3

| | Symbol | Hardness (HRC) | Area Fraction of Carbide (%) | Major Axis of Carbide (μm) | Charpy Impact Value (kgf·m/cm²) | Salt Water Spray Test | L10 Life (× 10⁷ cycles) |
|---|---|---|---|---|---|---|---|
| Invention | A | 59.6 | 3 or less | 3 or less | 3.9 | ○ | 10.6 |
| | B | 60.7 | 3 or less | 3 or less | 3.4 | ○ | 11.2 |
| | C | 61.2 | 3 or less | 3 or less | 3.1 | Δ | 10.1 |
| | D | 60.4 | 3 or less | 3 or less | 3.5 | ○ | 12.3 |
| | E | 60.2 | 3 or less | 3 or less | 3.7 | ○ | 10.5 |
| | F | 59.8 | 3 or less | 3 or less | 3.8 | ○ | 10.4 |
| Comparison | G | 61.2 | 3 or less | 3 or less | 3.3 | Δ | 11.3 |
| | H | 58.6 | 3 or less | 3 or less | 3.2 | ○ | 8.6 |
| | I | 60.2 | 3 or less | 3 or less | 3.7 | ○ | 10.5 |
| | J | 60.4 | 3 or less | 3 or less | 3.0 | ○ | 10.9 |
| | K | 60.2 | 3 or less | 3 or less | 3.1 | ○ | 11.9 |
| | L | 56.4 | 3 or less | 3 or less | 4.0 | ○ | 6.8 |
| | M | 58.2 | 4 | 6 | 1.6 | x | 7.6 |
| | N | 59.7 | 16 | 23 | 1.1 | x | 1.7 |

From Table 3, in the steels of examples, good effects were obtained in all the impact strength, the resistance to corrosion and the fatigue strength, because of fine carbides, small amounts thereof and further the influence of addition of nitrogen. M and N, the steels for comparison, are inferior to the steels of the invention in all, because of somewhat coarse carbides, large amounts thereof and no influence of addition of nitrogen.

Further, in the steel for comparison L, the. good workability was obtained, but the content of C+N was too small to obtain sufficient hardness, resulting in failure to obtain good rolling life. From the above, it has become clear that the steels of the invention are good in workability, and sufficient in rolling life and resistance to corrosion, so that inexpensive, high-functional bearings can be provided by constituting the bearings using these materials.

Furthermore, the acoustic performance and the resistance to fretting, characteristics required for bearings for various spindles, various spindle motors and swing arms for HDD drives, were evaluated. Results thereof are shown in Table 4. For the resistance to fretting, the wear depth of an inner race was measured by use of a fretting endurance tester shown in FIG. 1 under the following conditions to evaluate the resistance to fretting.

Figure 2:
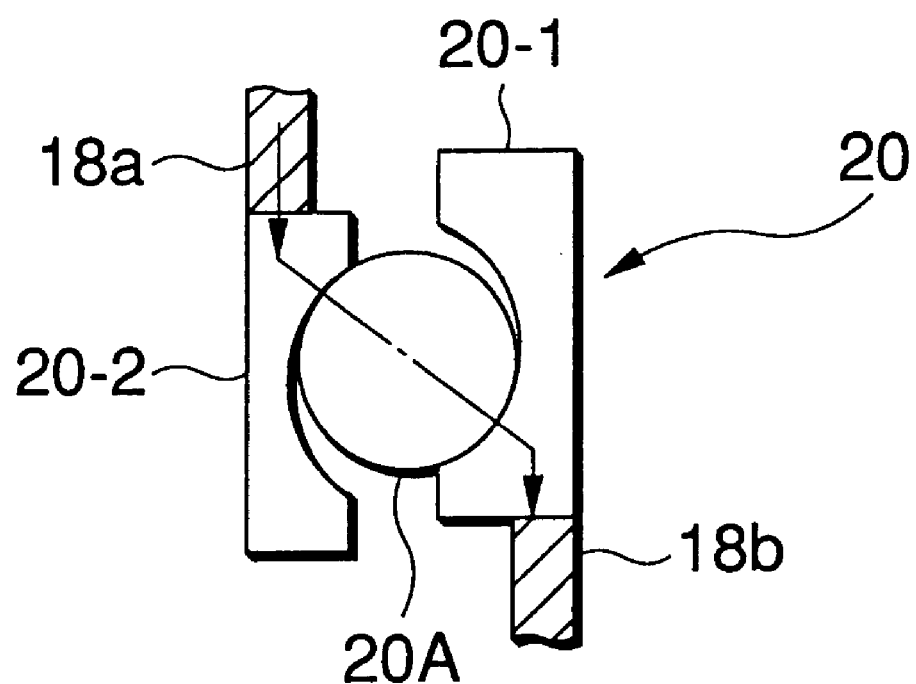
FIG. 2 is a schematic view in which force applied to a ball bearing with the fretting fatigue tester is indicated by arrows.

With respect to FIG. 1, the reference numeral 10 indicates a preload spring fixed to a shaft, 12 indicates a rotation stopper of the shaft, 4 indicates the shaft, 16 indicates a housing, 18a, 18b and 18c indicate sleeves formed separately from the shaft, 20 indicates a test bearing, 22 indicates a coned disc spring pressing the sleeves 18a, 18b and 18c in the shaft direction, 24 indicates a support bearing, and 26 indicates an AC servomotor. The shaft and an inner race are not rotated, and the housing and an outer race are rotatably supported. Preload is applied to an inner race 20-2, an outer race 20-1 and a rolling element 20A of the uppermost test bearing 20 as shown in FIG. 2, by allowing the sleeve 18a to be pressed, and similarly transmitted to each test bearing 20.

Fretting Endurance Test

Test Bearing: SR1810

Lubricant: Mineral oil grease

Frequency: 30 Hz

Load: 9.8 N

Oscillation Angle: 8°

Number of Cycles: 200,000,000 cycles

As described above, the present invention not only improves the functions of the conventional stainless steels, but also gives good workability. Accordingly, the stainless steels of the present invention can be suitably used as materials for bearings to be machined.

Example II

This example corresponds to the above-mentioned second embodiment.

Materials to be subjected to tests of the present invention were prepared as shown in Table 5.

TABLE 5

| Sample | C | Mn | Si | Cr | Mo | N | Remark |
|---|---|---|---|---|---|---|---|
| P | 0.85 | 0.80 | 0.30 | 0.25 | — | — | |
| Q | 1.01 | 0.30 | 0.30 | 1.50 | — | — | SUJ2 |
| N | 1.02 | 0.59 | 0.36 | 17.12 | 0.40 | — | SUS 440C |
| R | 0.63 | 0.70 | 0.47 | 12.97 | — | — | 13Cr stainless |
| S | 0.45 | 0.30 | 0.30 | 13.00 | — | 0.14 | N-containing stainless |

Heat treatment conditions of the samples, and examples of the invention and comparative examples are shown in Tables 6a and 6b. The resistance to fretting, a characteristic required for bearings for various spindles, various spindle motors and swing arms for HDD drives, was evaluated by

TABLE 4

| | Test Piece No. | Material Bearing Ring | Material Rolling Element | Acoustic Performance M. B. | Acoustic Performance H. B. | Torque Average Value (g·cm) | Wear Depth of Inner Race (µm) |
|---|---|---|---|---|---|---|---|
| Invention | 1 | B | B | 0.5 | 0.6 | 1.09 | 0.78 |
| | 2 | C | C | 0.6 | 0.7 | 1.05 | 0.75 |
| | 3 | D | D | 0.5 | 0.6 | 1.07 | 0.77 |
| | 4 | C | M | 0.6 | 0.7 | 1.07 | 0.70 |
| | 5 | D | N | 0.6 | 0.7 | 1.08 | 0.68 |
| Comparison | 6 | M | M | 1.2 | 1.3 | 1.22 | 0.91 |
| | 7 | N | N | 1.5 | 2.5 | 1.17 | 0.74 |
| | 8 | L | L | 0.5 | 0.6 | 1.31 | 2.12 |

Table 4 shows that the steels of the invention contain no coarse carbides and have high hardness, so that they are excellent in acoustic performance and further low in torque. Further, they are also good in resistance to fretting by the effect of nitrogen contributing to the wear resistance, as well as high hardness, and the bearings in which high carbon Cr stainless steels are used in the rolling elements are particularly effective.

In contrast, the test pieces for comparison Nos. 6 and 7 are examples in which the races and the rolling elements are both formed of conventional high carbon Cr stainless steels, and somewhat poor in acoustic performance, because of presence of coarse carbides. No. 6 which is small in the carbon content has a tendency to be somewhat poor in resistance to fretting. Further, it is insufficient in hardness, and tends to increase torque by internal wear. In the test piece for comparison No. 8, the content of C+N is less than 0.45, so that the hardness is insufficient and the resistance to fretting is significantly deteriorated.

measuring the wear depth of an inner race, torque before and after test and the fluctuation width of torque by use of a fretting endurance tester shown in FIG. 1 under the following conditions. The degree of torque and the fluctuation width thereof were measured at a rate of 2 rpm turning the bearing at 360° to make evaluation using each average value and fluctuation width.

Fretting Test Conditions

Test bearing: SR1810

Lubricant: Mineral oil grease

Frequency: 30 Hz

Load: 9.8 N

Oscillation Angle: 8°

Number of Cycles: 200,000,000 cycles

TABLE 6a

| Example | Test No. | Inner and Outer Races Material | Inner and Outer Races Heat Treatment | Rolling Element Material | Rolling Element Heat Treatment | Acoustic Performance M. B. | Acoustic Performance H. B. |
|---|---|---|---|---|---|---|---|
| Invention | 11 | P | Hardening: 820–860° C. Tempering: 160–200° C. | N | Hardening: 1020–1070° C. (−80° C. subzero) Tempering: 160–200° C. | 0.5 | 0.7 |
| | 12 | P | Hardening: 820–860° C. Tempering: 160–200° C. | R | Hardening: 1020–1070° C. (−80° C. subzero) Tempering: 160–200° C. | 0.5 | 0.6 |
| | 13 | P | Hardening: 820–860° C. (−80° C. subzero) Tempering: 160–200° C. | S | Hardening: 1020–1070° C. (−80° C. subzero) Tempering: 160–200° C. | 0.4 | 0.5 |
| | 14 | Q | Hardening: 820–860° C. (−80° C. subzero) Tempering: 160–200° C. | N | Hardening: 1020–1070° C. (−80° C. subzero) Tempering: 160–200° C. | 0.5 | 0.7 |
| | 15 | Q | Hardening: 820–860° C. Tempering: 160–200° C. | R | Hardening: 1020–1070° C. (−80° C. subzero) Tempering: 160–200° C. | 0.6 | 0.6 |
| | 16 | Q | Hardening: 820–860° C. Tempering: 160–200° C. | S | Hardening: 1020–1070° C. (−80° C. subzero) Tempering: 160–200° C. | 0.5 | 0.6 |
| Comparison | 17 | P | Hardening: 820–860° C. Tempering: 160–200° C. | P | Hardening: 820–860° C. Tempering: 160–200° C. | 0.4 | 0.4 |
| | 18 | Q | Hardening: 820–860° C. Tempering: 160–200° C. | Q | Hardening: 820–860° C. Tempering: 160–200° C. | 0.5 | 0.6 |
| | 19 | Q | Hardening: 820–860° C. (−80° C. subzero) Tempering: 160–200° C. | Q | Hardening: 820–860° C. (−80° C. subzero) Tempering: 160–200° C. | 0.5 | 0.5 |
| | 20 | N | Hardening: 1020–1070° C. (−80° C. subzero) Tempering: 160–200° C. | N | Hardening: 1020–1070° C. (−80° C. subzero) Tempering: 160–200° C. | 1.5 | 2.5 |
| | 21 | R | Hardening: 1020–1070° C. (−80° C. subzero) Tempering: 160–200° C. | R | Hardening: 1020–1070° C. (−80° C. subzero) Tempering: 160–200° C. | 1.2 | 1.3 |
| | 22 | R | Hardening: 1020–1070° C. (−80° C. subzero) Tempering: 160–200° C. | Q | Hardening: 820–860° C. Tempering: 180–200° C. | 0.8 | 0.9 |

TABLE 6b

| Example | Test No. | Average Value of Torque (g·cm) Before Test | Average Value of Torque (g·cm) After Test | Fluctuation Width of Torque (g·cm) Before Test | Fluctuation Width of Torque (g·cm) After Test | Wear Depth of Inner Race (μm) |
|---|---|---|---|---|---|---|
| Invention | 11 | 1.04 | 1.38 | 0.32 | 0.99 | 0.92 |
| | 12 | 1.06 | 1.40 | 0.32 | 0.98 | 0.93 |
| | 13 | 1.01 | 1.24 | 0.31 | 0.93 | 0.76 |
| | 14 | 1.00 | 1.27 | 0.33 | 0.96 | 0.82 |
| | 15 | 1.06 | 1.37 | 0.32 | 1.00 | 0.91 |
| | 16 | 1.05 | 1.31 | 0.30 | 0.95 | 0.86 |
| Comparison | 17 | 1.08 | 2.10 | 0.31 | 1.37 | 2.14 |
| | 18 | 1.09 | 2.08 | 0.32 | 1.33 | 2.03 |
| | 19 | 1.01 | 1.89 | 0.31 | 1.24 | 1.87 |
| | 20 | 1.17 | 1.53 | 0.53 | 0.98 | 0.74 |
| | 21 | 1.22 | 1.64 | 0.42 | 1.10 | 0.91 |
| | 22 | 1.18 | 1.87 | 0.38 | 1.21 | 1.02 |

From Tables 6a and 6b, the bearings of the invention are constituted by using the specific high carbon steel of the above (4) in the races and the high Cr martensitic stainless steels in the rolling elements, so that the mutual interference of coarse carbide particles is eliminated, and further the roughness accuracy and the hardness on the race side are improved, thus realizing good acoustic performance and low torque. Further, fretting damage on the race side is reduced by forming the rolling elements of the stainless steels to prevent the functional depression of the bearings.

In particular, when the rolling elements are formed of the stainless steels containing nitrogen, the fretting damage is effectively inhibited, and further, coarsening of the carbides is also inhibited. Accordingly, the acoustic performance also tends to be improved. When Material P containing 0.9% by weight or less of C and 0.6% by weight or less of Cr is used as the high carbon steel forming the rolling elements, it is seen that both the acoustic performance and the torque tend to be improved. In contrast, with respect to Nos. 17 to 19 which are comparative examples, both the races and the rolling elements are formed of the high carbon steels, so that they are liable to suffer from the fretting damage, resulting in a significant functional depression as the bearings, although they have good acoustic performance.

In Nos. 20 and 21, both the races and the rolling elements are formed of the stainless steels, so that the cost is high.

Further, although the fretting damage is relatively small, the sufficient acoustic performance can not be obtained because of the mutual interference of carbide particles and deterioration of roughness accuracy. In No. 22, the bearing is constituted by using the stainless steel in the race and the high carbon steel in the rolling elements. Accordingly, not only a cost reduction effect is small, but also it is rather inferior to the examples of the invention in acoustic performance, and the torque and torque fluctuation are also increased.

Further, it more easily suffers from the fretting damage than the bearing in which the race and the rolling elements are both formed of the stainless steel, unfavorably resulting in damage of the inherent functions of the stainless steel.

As described above, the high-functional ball bearings for various spindles, various spindle motors and swing arms for HDD devices can be provided at low cost by using the high carbon steels on the race side, for example, in the outer races and the inner races or the shafts, and the high Cr stainless steels in the rolling elements.

Example III

This example corresponds to the above-mentioned third embodiment.

As materials for inner and outer races, martensitic stainless steels containing very fine carbides and having the secondary hardenability were used, the martensitic stainless steels each containing 0.40% to 0.45% by weight of C, 0.05% to 0.20% by weight of N, 12.0% to 13.5% by weight of Cr, 0.1% to 0.8% by weight of Mn, 0.1% to 1.0% by weight of Si, and Fe and inevitable components as the balance, wherein C+N is 0.5% by weight or more.

Results of the acoustic measurement and the fretting endurance test for ball bearings of the invention are shown in Table 7, compared with results for the conventional, ball bearings for comparison. As a material used in examples of the invention, the above-mentioned martensitic stainless steel was used, which was hardened at a temperature of 1020° C. to 1070° C., and then, secondarily hardened at 450° C. for 2 hours, followed by cutting. Then, a nitride layer was formed as a surface layer thereof by the gas nitriding method at 410° C. for 24 hours, followed by finishing. The stainless steel having the nitride layer with a depth of about 20 $\mu$m (2% of Da: 31.8 $\mu$m) thus obtained is shown as "A" in Table 7. Comparison with a sample conventionally nitrided at 530° C. is described in Table 8 for reference. The example of the invention is less in deterioration of the surface roughness and the roundness, and relatively less in cutting allowance, compared with the comparative example. This is therefore effective as the heat treatment method of minute ball bearings for information instruments requiring accuracy.

SUJ2 used in the conventional ball bearings for various spindles and the 13Cr martensitic stainless steel used in ball bearings for swing arms used in HDD devices and the like which contain 0.60% to 0.75% of C, 10.5% to 13.5% of Cr, 0.3% to 0.8% of Mn, and Fe and inevitable components as the balance are described in comparative examples of Table 7, the latter being represented by B.

As a fretting endurance tester, the tester shown in FIG. 1 was used. The test bearing was tested with the inner race fixed and the outer race oscillated with the AC servomotor under the following conditions:

Test bearing: 695
Lubricant: Mineral oil grease
Frequency: 27 Hz
Load: 1.5 kgf
Oscillation Angle: 2°
Number of Cycles: 100,000 cycles As apparent from Table 7, the conventional SUJ2 ball bearing for spindles described in comparative example 35 is largely decreased in the acoustic level after the fretting endurance test, and therefore insufficient in resistance to fretting, although it is good in acoustic characteristics. The conventional 13Cr martensitic stainless steel ball bearing for swing arms described in comparative example 36 is inferior to the SUJ2 ball bearing in the acoustic level, although it is less lowered than the SUJ2 ball bearing in the acoustic level after the fretting endurance test and good in resistance to fretting.

In contrast, examples 31 to 34 of the invention are examples in which the steel of the invention was used in either the races or the rolling elements, and inhibition of adhesion to the opposite members improves the resistance to fretting, as well as the acoustic characteristics. When an increase in cost is allowable to some degree, the use of ceramic balls as the rolling elements tends to further improve the resistance to fretting, as shown in example 34 of the invention.

As described above, according to the present invention, it becomes possible to provide the ball bearings improved in resistance to fretting and good in acoustic characteristics.

In this example, the Mo-free steel is used as steel A, considering the material cost. However, addition of 3% by weight or less (preferably, 0.5% by weight or less in terms of cost) of Mo can further improve the secondary hardenability. Further, any material may be used as long as it has the secondary hardenability and a hardness of 57 or more in HRC.

TABLE 7

| | Material | | Anderon Value (before Test) | | Anderon Value (after Test) | |
|---|---|---|---|---|---|---|
| | Bearing Ring | Rolling Element | M.B. | H.B. | M.B. | H.B. |
| Example 31 | A | SUJ2 | 0.6 | 0.8 | 1.1 | 1.4 |
| Example 32 | SUJ2 | A | 0.7 | 0.8 | 1.3 | 1.7 |
| Example 33 | A | B | 0.7 | 0.9 | 1.0 | 1.2 |
| Example 34 | A | Si3N4 | 0.8 | 1.0 | 0.9 | 1.1 |
| Comparative Example 35 | SUJ2 | SUJ2 | 0.6 | 0.7 | 4.0 | 4.3 |
| Comparative Example 36 | B | B | 1.1 | 1.4 | 2.8 | 3.2 |

TABLE 8

| | Nitriding Conditions | | Surface Roughness Ra ($\mu$m) | | Roundness P-P (Radius Method) ($\mu$m) | |
|---|---|---|---|---|---|---|
| | Treating Temp. (° C.) | Treating Time (hr) | Before Nitriding | After Nitriding | Before Nitriding | After Nitriding |
| Invention | 410 | 24 | 0.12 | 0.18 | 0.4 | 0.7 |
| Comparison | 530 | 24 | 0.12 | 0.48 | 0.4 | 1.5 |

Example IV

This example corresponds to the above-mentioned fourth embodiment.

Materials to be subjected to tests of the invention were prepared as shown in Table 9. Further, the cutting test was conducted under the same conditions as with Example I.

The heat treatment qualities are shown in Tables 10 and 11, and results of evaluations of the acoustic performance, the resistance to fretting and the resistance to corrosion according to ball bearings 695 are shown in Table 12. In the tables, samples formed of SUJ2 are also described for comparison. After gas-cooled at a hardening temperature of 1030° C., and then subzero-treated at −80° C., followed by tempering at 160° C., A to F were subjected to the tests.

The carbide particles were observed under a scanning electron microscope at a 3000× magnification for 20 fields of view, and a particle having the maximum size in each field of view was selected, which was converted to a circle-corresponding diameter by image processing. The diameters obtained in 20 fields of view were averaged to calculate the particle size. Further, the area fraction of carbides was determined by observation under an optical microscope at 1000× magnification for 20 fields of view and image processing.

The acoustic performance was determined by measuring the M. B. and H. B. of the above-mentioned bearing with an anderon meter, and each was described as an average value of n=20. The fretting endurance test was made by setting the above-mentioned bearing on the endurance tester shown in FIG. 1 at a preload of 1.5 kgf, and measuring the anderon value after the endurance test under the conditions of 27-Hz frequency, 8° oscillation angle and 100,000 cycles. The bearing was lubricated under slight lubrication in which 2 to 3 mg of a synthetic ester oil was applied.

Further, the resistance to corrosion was evaluated by the salt water spray test according to JIS Z2371 in the same manner as with Example I. Taking no rust development as A, slight rust development as B, rust development on 20% or more of a test surface as C, rust development on the almost whole surface as D and remarkable rust development as E, the five-step evaluation was conducted, and results thereof are described.

From Table 10, in examples of the invention, the components, including the carbon content, are adjusted to the range in which the workability is improved, to thereby exhibit an improvement in tool life and a remarkable reduction in cost. In all comparative examples in which the 13Cr martensitic stainless steels (comparative examples 44 and 45) and SUS 440C (comparative example 46), the conventional steels, are used, the carbon content in the materials is high, and a large number of hard eutectic carbide particles are contained. Accordingly, they are inferior to the steels of the invention in workability.

Further, as apparent from Tables 11 and 12, the examples of the invention contain no coarse carbides, and the carbon content is reduced and nitrogen is added thereto, so that they are significantly superior to the comparative examples in acoustic performance and resistance to corrosion. Furthermore, in example 42 in which the content of O and Ti+0.1 Al is reduced, the content of a non-metallic inclusion harmful to the acoustic performance is reduced to further improve the acoustic performance. In example 43 in which the content of S is additionally reduced, even the resistance to corrosion is further improved. In contrast, comparative example 44 which is an example containing the 13Cr martensitic stainless steel, the conventional steel, contains a somewhat coarse eutectic carbide, so that it is inferior to the steels of the invention not only in acoustic performance, but also in resistance to corrosion. Comparative example 45, in which the content of S and Ti+0.1 Al in the 13Cr martensitic stainless steel, the conventional steel, is reduced, is inferior to the steels of the invention in an effect exerted on the acoustic performance or the resistance to corrosion because a coarse eutectic carbide remains. Comparative example 46, which is an example of SUS 440C, the conventional steel, is insufficient in both acoustic performance and resistance to corrosion because an extremely coarse eutectic carbide is contained. Further, comparative example 47, which is an example of SUJ2 used for spindle motors at present, is excellent in acoustic performance, but insufficient in resistance to corrosion and resistance to fretting.

Since the present invention ont only improves the functions of the conventional stainless steel but also imparts good workability thereto as described above, the steel of the present invention can be used suitably as a material for rolling bearings and is remarkably effective in cost reduction and high function particularly in a ball bearing for information apparatus.

As described above, in the ball bearing of the present invention, with respect to the stainless steel which is a constituent material thereof, carbon which adversely affects the resistance to corrosion and forms a coarse eutectic carbide to deteriorate the functions, when its content is large, is partly substituted by nitrogen having solid solution strengthening action at a level similar to that of carbon, and further the content of impurities is decreased, thereby inhibiting formation of the coarse eutectic carbide or the non-metallic inclusion harmful to the acoustic performance and the resistance to corrosion. As a result, the workability is also improved, thereby enabling the production of the high-functional ball bearing at low cost.

TABLE 9

| | Symbol | C (wt %) | Si (wt %) | Mn (wt %) | S (ppm) | Cr (wt %) | N (wt %) | Mo (wt %) | O (ppm) | Ti + 0.1 Al (ppm) |
|---|---|---|---|---|---|---|---|---|---|---|
| Example 41 | A | 0.43 | 0.30 | 0.30 | 120 | 13.0 | 0.14 | — | 22 | 55 |
| Example 42 | B | 0.43 | 0.30 | 0.30 | 130 | 13.0 | 0.14 | — | 7 | 28 |
| Example 43 | C | 0.43 | 0.30 | 0.30 | 50 | 13.0 | 0.14 | — | 6 | 25 |
| Comparative Example 44 | D | 0.65 | 0.35 | 0.70 | 110 | 12.9 | — | — | 18 | 52 |
| Comparative Example 45 | E | 0.65 | 0.35 | 0.70 | 50 | 12.9 | — | — | 7 | 25 |
| Comparative Example 46 | F | 1.05 | 0.40 | 0.65 | 120 | 17.4 | — | 0.38 | 23 | 46 |

TABLE 10

| | Symbol | Annealing Hardness (HRB) | Tool Life (min) |
|---|---|---|---|
| Example 41 | A | 88 | 89 |
| Example 42 | B | 89 | 90 |
| Example 43 | C | 89 | 80 |
| Comparative Example 44 | D | 93 | 56 |
| Comparative Example 45 | E | 93 | 50 |
| Comparative Example 46 | F | 95 | 41 |

TABLE 11

| | Symbol | Particle Size of Carbide (μm) | Area Fraction of Carbide (%) | Hardness (HRC) |
|---|---|---|---|---|
| Example 41 | A | 0.90 | 2 or less | 61.8 |
| Example 42 | B | 0.88 | 2 or less | 61.7 |
| Example 43 | C | 0.87 | 2 or less | 61.9 |
| Comparative Example 44 | D | 3.6 | 3–5 | 60.7 |
| Comparative Example 45 | E | 3.4 | 3–5 | 60.6 |
| Comparative Example 46 | F | 13.2 | 14–16 | 61.4 |

TABLE 12

| | Symbol | Acoustic Performance | | Resistance to Fretting | | Resistance to Corrosion (Salt Water Spray) |
|---|---|---|---|---|---|---|
| | | M.B. | H.B. | M.B. | H.B. | |
| Example 41 | A | 0.5 | 0.7 | 0.8 | 1.1 | B |
| Example 42 | B | 0.5 | 0.5 | 0.8 | 1.0 | B |
| Example 43 | C | 0.3 | 0.4 | 0.7 | 0.9 | A |
| Comparative Example 44 | D | 0.8 | 1.0 | 1.3 | 1.5 | D |
| Comparative Example 45 | E | 0.8 | 0.9 | 1.2 | 1.3 | C |
| Comparative Example 46 | F | 1.3 | 1.8 | 1.5 | 2.0 | D |
| Comparative Example 47 | SUJ2 | 0.4 | 0.5 | 3.6 | 4.0 | E |

Example V

This example corresponds to the above-mentioned fifth embodiment.

Materials to be subjected to tests of the invention and steels for comparison used as materials for races were prepared as shown in Table 13. Further, materials used for rolling elements are described in Table 14.

695 was used as bearings, the races were formed of the materials described in Table 13, and the rolling elements formed of the materials described in Table 14 were incorporated therein, and then subjected to the test. The materials for races described in Table 14 were hardened at a temperature of 1030° C., and subzero-treated, followed by tempering at 160° C. for 2 hours. Carbides contained in the respective materials at this time had a particle size of 0.9 μm and a area fraction of 2% or less for steel A and steel B of the invention, whereas had a particle size of 4 μm or more and a area fraction of 3% or more for steel C and steel D for comparison.

Figure 4A:
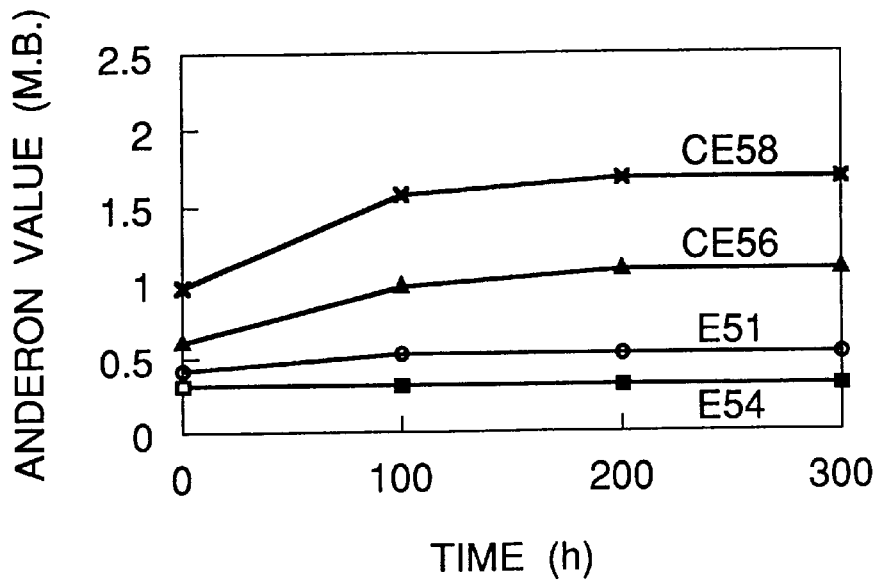
FIGS. 4a and 4b are a graph showing changes in acoustic performance in Example V.
Figure 4B:
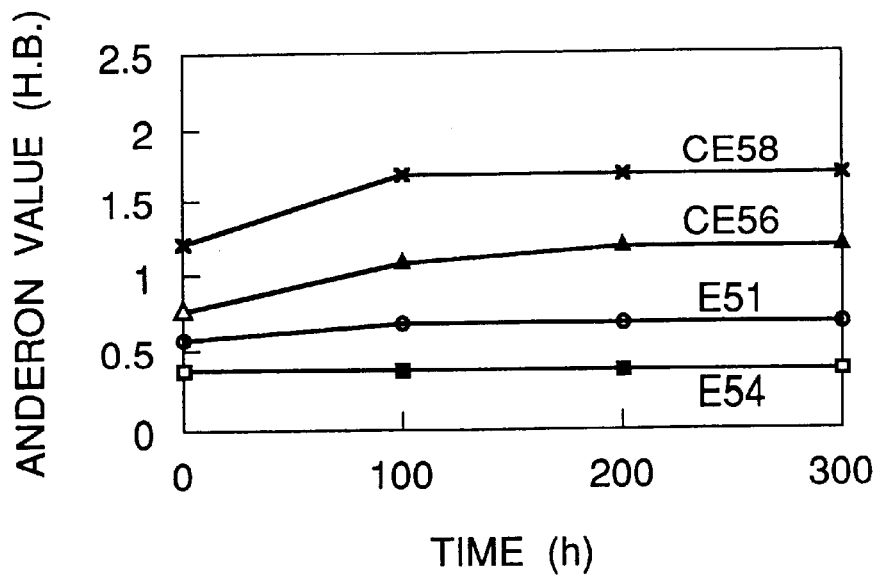

Combinations of the invention, combinations for comparison and a comparison of the acoustic performance thereof are shown in Table 15. Further, changes with time in anderon values measured by use of the bearings shown in Table 15 are shown in FIGS. 4a and 4b, in which E51, E54, CE56 and CE 58 indicate Examples 51 and 54, Comparative Examples 56 and 58, respectively. The measurement of changes with age was made by incorporating the above-mentioned bearing into a spindle motor, conducting a rotation test at a load of 2.0 kgf at a revolution of 7200 rpm, and similarly measuring anderon values with stopping for every 100 hours. Further, the resistance to corrosion described in Table 15 was evaluated by the salt water spray test according to JIS Z2371 using a 5% solution of NaCl at 35° C., after an outer race of the bearing was completely degreased with acetone. Results of the four-step evaluation in the order of ⊚, ○, Δ and x from a better to a worse are shown in the table.

From Table 15, examples 51 to 55 of the invention in which the steels of the invention are used in the races and the high carbon bearing steels are used in the rolling elements are superior to the comparative examples in acoustic performance and resistance to corrosion, because the steels of the invention contain very fine carbides compared with the steels for comparison. In Table 15, the comparative examples in which the inner races, the outer races and the rolling elements are all formed of the single materials are described, wherein 59 is the case of steel X (SUJ2), and 60 is the case of steel C. 60 is superior to 59 in resistance to corrosion, but inferior to 59 in acoustic performance or cost because of a hard and coarse carbide contained. Comparative examples 56 and 57 in which only the rolling elements are formed of steel X or steel Y (SUJ2) are remarkably improved in acoustic performance, but somewhat inferior to 59 in which all are formed of steel X (SUJ2). Further, comparative example 58 is an example in which the race is formed of steel D (SUS 440C) and the rolling elements are formed of steel X (SUJ2), and inferior to 56 or 57 in acoustic performance because of a coarse carbide. In the examples of the invention, the acoustic performance is more improved particularly when steel B in which the content of O and Ti+0.1 Al is reduced is used in the race and steel Y (SUJ2) in which the content of O and Ti+0.1 Al is reduced likewise is used in the rolling elements. Further, when the rolling elements are formed of steel Z containing smaller amounts of C and Cr than SUJ2, the acoustic performance tends to be more improved because carbide particles are made fine and decreased. It has been confirmed that C is preferably within the range of 0.8% to 0.9% by weight and Cr is preferably within the range of 0.1% to 0.6% by weight.

Figure 5:
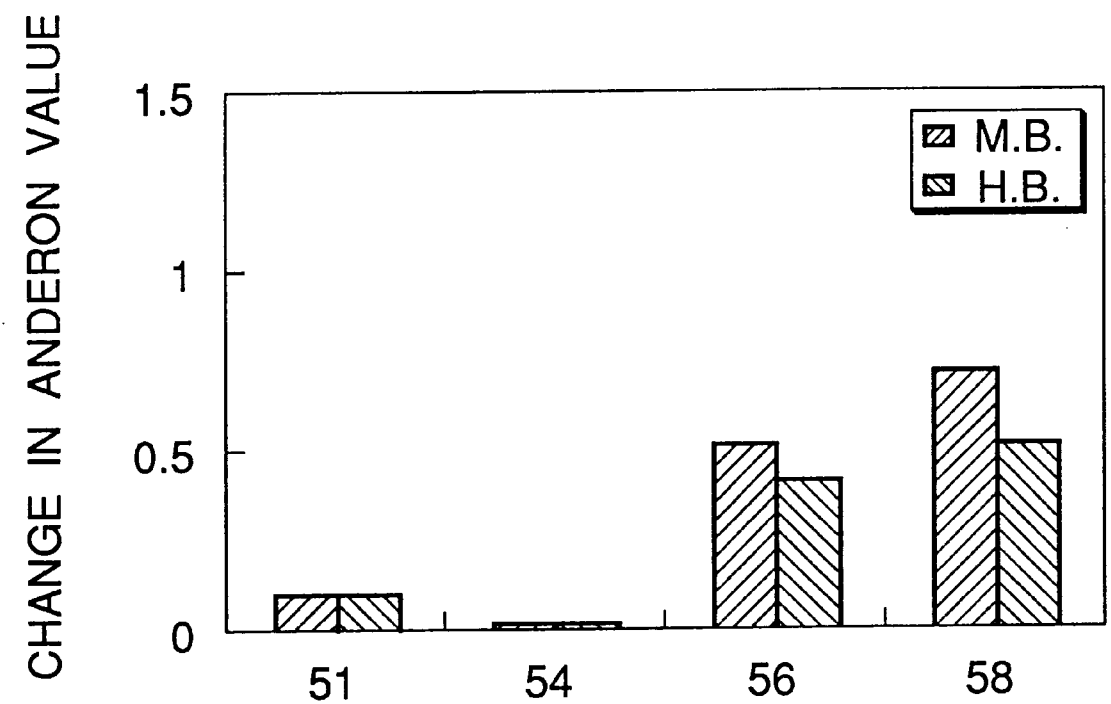
FIG. 5 is a graph showing changes in initial anderon values and anderon values after 300 hours in Example V.

Further, as described in FIGS. 4a and 4b, the examples of the invention reduces damage of the opposite members, namely the rolling elements, to inhibit deterioration of accuracy, because the steels of the invention have an effect of conversion to a passive state giving a frictional wear inhibiting effect, thus resulting in extremely reduced deterioration with age of the acoustic performance. In contrast, in comparative examples 56 and 58, the frictional wear inhibiting effect is smaller than that in the examples of the invention and coarse hard carbide particles are contained, so that the accuracy of the rolling elements is significantly deteriorated and the durability is poor. In FIG. 5, changes in initial anderon values and anderon values after the 300-hour rotation test are shown. In the comparative examples, the anderon values largely change after the rotation test, whereas in the examples of the invention, no substantial deterioration of the acoustic performance is observed. It is therefore confirmed that the examples of the invention have good durability.

As described above, the present invention is highly effective for both the cost reduction and the high functions, particularly in bearings for information instruments.

As described above, in the ball bearing of the present invention, with respect to the stainless steel which is a constituent material thereof, carbon which adversely affects the resistance to corrosion and forms a coarse eutectic carbide to deteriorate the functions, when its content is large, is partly substituted by nitrogen having solid solution strengthening action at a level similar to that of carbon, and further the content of impurities is decreased, thereby inhibiting formation of the coarse eutectic carbide or the nonmetallic inclusion harmful to the acoustic performance and the resistance to corrosion. Further, the rolling elements are formed of the high carbon bearing steel advantageous in cost, thereby enabling the production of the high-functional durable ball bearing at low cost.

TABLE 13

| Symbol | C (wt %) | Si (wt %) | Mn (wt %) | Cr (wt %) | N (wt %) | Mo (wt %) | O (ppm) | Ti + 0.1Al (ppm) |
|---|---|---|---|---|---|---|---|---|
| A | 0.43 | 0.30 | 0.30 | 13.0 | 0.14 | — | 22 | 55 |
| B | 0.43 | 0.30 | 0.30 | 13.0 | 0.14 | — | 7 | 28 |
| C | 0.67 | 0.35 | 0.70 | 12.9 | — | — | 23 | 54 |
| D | 1.05 | 0.40 | 0.65 | 17.4 | — | 0.38 | 23 | 46 |

TABLE 14

| Symbol | C (wt %) | Si (wt %) | Mn (wt %) | Cr (wt %) | O (ppm) | Ti + 0.1Al (ppm) |
|---|---|---|---|---|---|---|
| X | 1.05 | 0.30 | 0.30 | 1.51 | 13 | 58 |
| Y | 1.04 | 0.30 | 0.30 | 1.47 | 7 | 31 |
| Z | 0.87 | 0.30 | 0.90 | 0.27 | 8 | 38 |

TABLE 15

| | No. | Material | | | Acoustic Performance | | Resistance |
| | | Outer Race | Inner Race | Rolling Element | (Initial Anderon Value) | | to Corrosion |
| | | | | | M.B. | H.B. | |
|---|---|---|---|---|---|---|---|
| Invention | 51 | A | A | x | 0.4 | 0.6 | ⊚ |
| | 52 | A | A | Y | 0.3 | 0.6 | ⊚ |
| | 53 | A | A | Z | 0.3 | 0.5 | ⊚ |
| | 54 | B | B | Y | 0.3 | 0.4 | ⊚ |
| | 55 | B | B | Z | 0.3 | 0.3 | ⊚ |
| Comparison | 56 | C | C | x | 0.6 | 0.8 | Δ |
| | 57 | C | C | Y | 0.6 | 0.7 | Δ |
| | 58 | D | D | x | 1.0 | 1.2 | ○ |
| | 59 | x | x | x | 0.4 | 0.6 | x |
| | 60 | C | C | C | 0.8 | 1.1 | Δ |

Using materials having a diameter of 65 mm similarly prepared, cold drawing was performed under respective conditions of surface decreasing rates of 10%, 20% and 30% to examine the working hardenability (evaluated by the hardness after cold drawing) to each surface decreasing rates. Further, using test pieces having a surface decreasing rate of 30%, cold drawing was conducted, followed by standing for 24 hours. Then, surfaces thereof were observed, and ones on which aging cracks were observed are designated by "x" in the table.

"a" to "f", steels of the invention, were low in hardness after annealing, and good in both deformability and resistance to deformation. Further, the working hardenability to the surface decreasing rate in cold working was low, and no ageing crack was observed. In contrast, all comparative examples except for steel "l" showed results inferior to those of the steels of the invention. As to "g" to "k", the content of alloy components did not satisfy the range of the embodiment, and steel "m" contained no nitrogen. Accordingly, eutectic carbides having a size of about 5 μm to about 10 μm were produced more or less, which caused deterioration of the cold workability. In particular, "n" to "p", conventional SUS 440C or 13Cr martensitic stainless steels, were very poor in workability, working strains remained therein, and ageing clacks were developed starting from vicinities of coarse carbide particles.

Further, heat treatment was conducted under the following conditions, and the surface hardness (0.15 mm in depth), the hardened layer depth (550 Hv), the resistance to corrosion according to the salt water spray test, and the rolling fatigue strength were measured. The respective test conditions are described below.

Example VI

This example corresponds to the above-mentioned sixth embodiment.

Materials to be subjected to tests and steels for comparison were prepared as shown in Table 16. Further, results of evaluation of the cold workability are shown in Table 17. As test pieces, ones obtained by hot-rolling a molten material to a diameter of 20 mm, annealing and cutting it to a length of 25 mm were used, and the end face complete constraint test was conducted to examine the resistance to deformation at a draft of 50% and the critical ratio to crack initiation of each material.

TABLE 16

| | Symbol | C | Si | Mn | Cr | Mo | V | N |
|---|---|---|---|---|---|---|---|---|
| Invention | a | 0.37 | 0.57 | 0.38 | 13.25 | — | — | 0.11 |
| | b | 0.40 | 0.33 | 0.31 | 13.00 | — | — | 0.18 |
| | c | 0.50 | 0.30 | 0.28 | 12.87 | 0.42 | — | 0.18 |
| | d | 0.43 | 0.40 | 0.30 | 12.95 | — | — | 0.14 |
| | e | 0.33 | 0.50 | 0.52 | 12.30 | — | 0.12 | 0.13 |
| | f | 0.35 | 0.30 | 0.40 | 13.01 | 0.10 | 0.11 | 0.13 |

TABLE 16-continued

|  | Symbol | C | Si | Mn | Cr | Mo | V | N |
|---|---|---|---|---|---|---|---|---|
| Comparison | g | 0.39 | 1.13 | 0.51 | 13.03 | — | — | 0.13 |
|  | h | 0.35 | 0.50 | 1.10 | 12.99 | — | 0.42 | 0.14 |
|  | i | 0.37 | 0.42 | 0.34 | 12.99 | 0.67 | — | 0.13 |
|  | j | 0.39 | 0.57 | 0.52 | 16.43 | — | — | 0.14 |
|  | k | 0.43 | 0.45 | 0.44 | 13.00 | 0.22 | 0.32 | 0.12 |
|  | l | 0.38 | 0.35 | 0.70 | 13.05 | 0.09 | — | 0.02 |
|  | m | 0.46 | 0.36 | 0.36 | 13.01 | — | — | — |
|  | n | 0.72 | 0.48 | 0.49 | 11.50 | 0.10 | — | — |
|  | o | 0.65 | 0.16 | 0.69 | 12.50 | 0.10 | — | — |
|  | p | 1.07 | 0.38 | 0.57 | 17.26 | 0.38 | — | — |

TABLE 17

|  | Symbol | Annealing Hardness (HRB) | Resistance to Deformation (N/mm$^2$) | Deformability (%) | Working Hardenability (Surface Decreasing Rate) | | | Aging Crack | Total Evaluation |
|---|---|---|---|---|---|---|---|---|---|
|  |  |  |  |  | 10% (HRB) | 20% (HRB) | 30% (HRB) |  |  |
| Invention | a | 88.9 | 1020 | 72 | 94.6 | 98.1 | 99.7 | ○ | ○ |
|  | b | 89.0 | 1040 | 73 | 94.9 | 98.6 | 100.4 | ○ | ○ |
|  | c | 89.5 | 1120 | 70 | 95.2 | 98.7 | 100.7 | ○ | ○ |
|  | d | 89.0 | 1060 | 72 | 94.7 | 96.4 | 100.1 | ○ | ○ |
|  | e | 89.5 | 1100 | 71 | 95.2 | 98.6 | 100.8 | ○ | ○ |
|  | f | 89.4 | 1090 | 72 | 94.8 | 98.5 | 100.6 | ○ | ○ |
| Comparison | g | 94.0 | 1380 | 64 | 100.8 | 103.9 | 105.4 | x | x |
|  | h | 93.7 | 1340 | 65 | 100.4 | 103.5 | 104.8 | x | x |
|  | i | 92.8 | 1330 | 66 | 99.5 | 102.4 | 103.8 | ○ | Δ |
|  | j | 91.2 | 1280 | 67 | 98.1 | 101.0 | 102.7 | ○ | Δ |
|  | k | 93.2 | 1330 | 66 | 100.2 | 103.0 | 104.4 | ○ | Δ |
|  | l | 89.0 | 1080 | 69 | 94.7 | 98.3 | 100.2 | ○ | ○ |
|  | m | 91.0 | 1200 | 66 | 98.0 | 100.7 | 102.5 | x | x |
|  | n | 92.4 | 1350 | 64 | 99.2 | 102.3 | 103.6 | x | x |
|  | o | 93.8 | 1390 | 63 | 100.7 | 103.6 | 104.9 | x | x |
|  | p | 95.4 | 1520 | 55 | 102.7 | 106.2 | 108.0 | x | x |

Heat Treatment Conditions

Test Piece: φ 13.2×490 (only 400 mm in a center portion is hardened)

Induction Hardening Device:

Oscillation System: Transistor-invertor system

Output: 200 kW

Frequency: 30 kHz

Hardening Conditions: 310 V×24 m/second (hardening temperature: 1050–1120° C., according to measurement with a radiation thermometer)

Hardening: –80° C.×1 hour after water cooling

Tempering: 170° C.×1.5 hours

Salt Water Spray Test

This test was performed using a 5% solution of NaCl at 35° C. according to JIS Z2371, and judged by observing an external appearance thereof after a test time of 50 hours. The degree of rust development was evaluated by the three steps of ○, Δ and x from a better to a worse.

Rolling Fatigue Strength Test

Figure 3A:
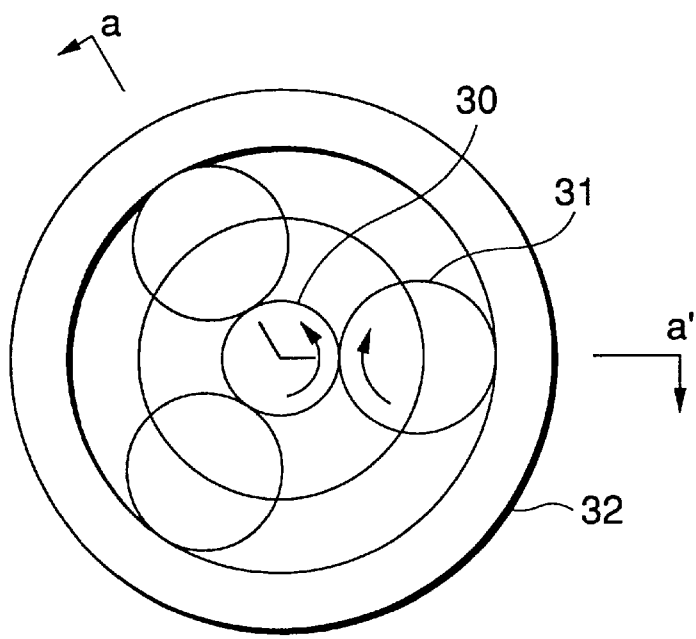
Figure 3B:
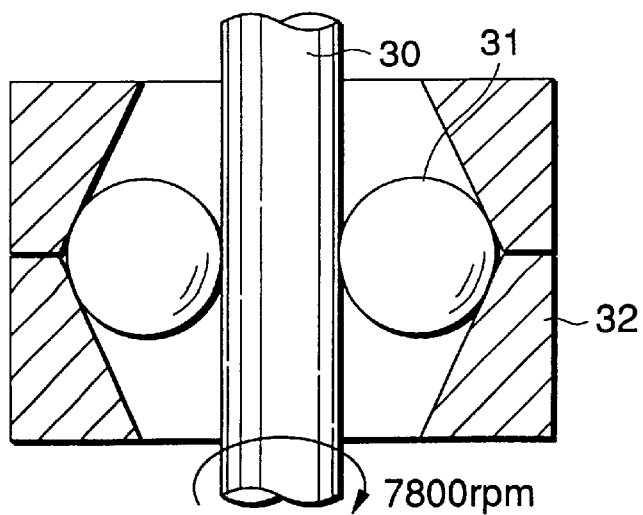

The fatigue strength test was performed by the surface damage type radial strength test as shown in FIG. 3, based on the fact that almost all damage forms of commercial linear guide bearing apparatuses observed are peeling-like surface damage, and the cumulative number of repeated stress cycles (life) up to the time when flaking was developed on each sample was examined to prepare Weibull plots. Then, the L10 life of each sample was determined from each Weibull distribution. The test conditions thereof are described below:

Test Surface Pressure: 450 kgf/mm$^2$

Revolution: 7800 rpm

Lubricant: S10 turbine oil (Manufactured by Idemitsu Petrochemical Co., Ltd.)

Rolling Element: 3 balls of $^{27}/_{32}$ inch (average roughness: 0.27 μm)

(1) of FIG. 3 shows a plan view of this tester, and (2) shows a cross sectional view taken along line a–a' of (1). The reference numeral 30 indicates a test piece (φ 12.9×80), 31 indicates $^{27}/_{32}$-inch balls, and 32 indicates a ring. The test piece is rotated at 7800 rpm.

TABLE 18

|  | Symbol | Hardness (HRC) | Hardened Layer Depth (mm) | Salt Water Spray Test | $L_{10}$ Life (× 10$^6$ cycles) |
|---|---|---|---|---|---|
| Invention | a | 61.7 | 1.5 | ○ | 10.6 |
|  | b | 62.1 | 1.5 | ○ | 10.8 |
|  | c | 62.0 | 1.4 | ○ | 11.4 |
|  | d | 61.9 | 1.5 | ○ | 10.6 |
|  | e | 62.2 | 1.4 | ○ | 11.2 |
|  | f | 61.9 | 1.4 | ○ | 10.7 |
| Comparison | g | 61.7 | 1.4 | ○ | 11.3 |
|  | h | 58.7 | 1.5 | ○ | 8.6 |
|  | i | 62.0 | 1.4 | ○ | 10.5 |
|  | j | 61.7 | 1.5 | ○ | 10.9 |
|  | k | 61.9 | 1.4 | ○ | 11.9 |
|  | l | 60.6 | 1.4 | Δ | 4.8 |
|  | m | 60.1 | 1.3 | x | 7.6 |
|  | n | 59.8 | 1.1 | x | 2.4 |
|  | o | 60.2 | 1.2 | x | 2.8 |
|  | p | 59.4 | 0.9 | x | 1.3 |

From Table 18, in the examples of the invention, sufficient hardness and hardened layer depth can be easily obtained even in short-time heating by induction hardening, compared with "n", "o" and "p", the conventional steels, because carbides and nitrides are dispersed finely and uniformly. Further, good results are obtained in both the resistance to corrosion and the fatigue strength also by the influence of addition of nitrogen. In "l", the comparative example, good workability is obtained. However, it is inferior to the steels of the invention in fatigue strength and resistance to corrosion, because the total content of carbon and nitrogen is small and the influence of addition of nitrogen is insufficient.

From the above, the steels of the invention are good in workability and heat treatment productivity, and also good in rolling life and resistance to corrosion, so that they are in prospect as martensitic stainless steels for rolling. It has become clear that inexpensive, high-functional linear guide bearing apparatuses made of stainless steels can be provided by constituting the bearings using the materials of the present invention.

Example VII

This example corresponds to the above-mentioned seventh embodiment.

Materials to be subjected to tests and steels for comparison were prepared using alloy components as shown in Table 19. Further, the heat treatment qualities after heat treatment, results of the evaluation test of the resistance to corrosion and results of the rolling life test are shown in Table 20. In respect to,heat treatment conditions, the heating temperature was 1030° C. to 1120° C., and immediately after cooling with nitrogen gas, subzero treatment was conducted at −190° C. for 30 minutes, followed by tempering at 160° C. to 180° C. for 2 hours, or at 450° C. to 520° C. for 2 hours. In the table, the treatment at 160° C. to 180° C. for 2 hours is designated as "treatment A", and the treatment at 450° C. to 520° C. for 2 hours is designated as "treatment B".

The reason why the treatment temperature of treatment B is set to 450° C. to 520° C. is that hardening at a temperature higher than the range initiates coagulation of secondarily precipitated carbides and nitrides to cause not only softening but also rapid deterioration of the resistance to corrosion.

The heat treatment qualities were judged for δ-ferrite and the eutectic carbide. For δ-ferrite, 400-mm$^2$ fields of view to be inspected were observed under an optical microscope at 400× magnification, and when δ-ferrite was observed, it was described as "x" in the table. For the eutectic carbides, image processing was performed, and when the carbide having a circular-corresponding diameter exceeding 3 μm was observed, 10 particles were sampled in the order of the size thereof and an average value thereof was obtained. When no particle having a circular-corresponding diameter exceeding 3 μm was observed, it was rated as "none".

The resistance to corrosion was evaluated by the salt water spray test and the measurement of pitting potential. The salt water spray test was performed using a 5% solution of NaCl at 350° C. according to JIS Z2371, and judged by observing an external appearance thereof after a test time of 150 hours. In Table 20, "◎" indicates no rust development, "○" indicates slight rust development, "Δ" indicates rust development on the almost whole surface, and "x" indicates remarkable rust development. Further, the pitting potential was measured according to JIS G0577. First, the test piece polished to #800 with abrasive paper was immersed in a 30% solution of HNO$_3$ at 60° C. for 1 hour to conduct passive state formation treatment, and then, swept in a 3.5% solution of NaCl at 30° C. at a potential sweep rate of 20 mV/minute. The pitting potential was evaluated by mV vs SCE at the time when the anode current density reached 100 μA/cm$^2$.

Further, the life test was conducted using a thrust type rolling life tester described in *Handbook of Special Steels*, the first edition, pages 10 to 21 (edited by Denki Seiko Kenkyusho, published on May 25, 1969, Rikogakusha) under the following conditions, and the cumulative number of repeated stress cycles (life) up to the time when flaking was developed on each sample was examined to prepare Weibull plots. Then, the L10 life of each sample was determined from each Weibull distribution.

Clean Lubrication Life Test
  Surface Pressure: 4900 Mpa
  Revolution: 1000 rpm
  Lubricating Oil: #68 turbine oil
Salt Water Spray Cycle Life Test First, the salt water spray test was carried out for 2 hours under the conditions based on JIS Z2371 described above, and after sufficient degreasing with acetone, the above-mentioned clean lubrication life test was conducted up to 1×10$^7$ cycles. When not damaged at this time, the salt water spray test was similarly carried out for 2 hours, after degreasing with acetone, and this treatment was repeated. The cumulative number of repeated cycles up to the time when flaking was developed on each sample was taken as the life. Similarly with the clean lubrication life test, Weibull plots were prepared and the L10 life of each sample was determined from each Weibull distribution, thereby making evaluation.

From Tables 19 and 20, in the steels of the invention, formation of coarse eutectic carbides is prevented by satisfying C %≦−0.05 Cr %+1.41, and formation of δ-ferrite harmful to the toughness and life is also prevented by allowing the mutual relationship between (eq1)=Cr %+Si %+1.5 Mo % and (eq2)=C %+0.83 N %+0.12 Mn %+0.05 Ni %+0.02 Cu % to satisfy (eq2)≧0.04×(eq1)−0.39. Further, the pitting index PI value satisfies PI=Cr %+3.3 Mo %+30 N %−45 C %≧10.0, and the total content of C and N satisfies C+N≧0.4%, so that the steels of the invention are very high in hardness and excellent in resistance to corrosion. As apparent from Table 20, the steels of the invention indicated by 71 to 83 are very excellent in resistance to corrosion and long in life. In particular, comparative examples 84 and 85, the conventional martensitic stainless steels, are greatly reduced in life by the salt water spray cycle life test, whereas the steels of the invention show a long life.

Further, the steels of the invention are secondarily hardened without so much damage of the resistance to corrosion, as shown in 81 to 83, so that they can be sufficiently used in high-temperature specification in which relatively high temperature is used or dimensional stability is required.

Comparative examples 84 and 85, the conventional martensitic stainless steels, are low in carbon content, so that they are poor in resistance to corrosion. In particular, comparative example 85 does not satisfies equation 1, so that the eutectic carbide is extremely coarse and the life is short. Comparative examples 86, 88 and 93 to 100 satisfy equations 1 and 2, but the pitting index PI of equation 3 is not sufficiently secured. They are therefore inferior to the steels of the invention in resistance to corrosion. Comparative examples 87, 89 and 90 do not satisfy equation 1, so that the coarse eutectic carbides are formed to deteriorate the resistance to corrosion and the life. Comparative examples 91 and 101 do not satisfy equation 2, resulting in formation of δ-ferrite. In comparative example 92, the total content of carbon and nitrogen for solid solution strengthening of martensite is less than 0.4% by weight, so that the hardness is insufficient to lower the life.

As described above, the present invention significantly improves the resistance to corrosion and the life of the conventional stainless steels to provide the highly corrosion resisting martensitic stainless steels for rolling.

TABLE 19

| No. | C | Si | Mn | Cr | Mo | Ni | Cu | N | eq2 | α | PI | β |
|---|---|---|---|---|---|---|---|---|---|---|---|---|
| A-1 | 0.35 | 0.28 | 0.29 | 18.21 | 1.03 | — | — | 0.18 | 0.5342 | 0.4114 | 11.259 | 0.4995 |
| A-2 | 0.28 | 0.31 | 0.28 | 18.03 | 0.62 | — | — | 0.17 | 0.4347 | 0.3808 | 12.576 | 0.5085 |
| A-3 | 0.39 | 0.35 | 0.30 | 17.98 | 1.88 | — | 0.97 | 0.18 | 0.5948 | 0.456 | 12.034 | 0.511 |
| A-4 | 0.35 | 0.45 | 0.34 | 16.12 | 1.86 | — | — | 0.14 | 0.507 | 0.3844 | 10.708 | 0.604 |
| A-5 | 0.40 | 0.50 | 0.32 | 16.04 | 2.45 | 0.48 | — | 0.13 | 0.5703 | 0.4186 | 10.025 | 0.608 |
| A-6 | 0.30 | 0.30 | 0.26 | 17.97 | 2.01 | — | — | 0.19 | 0.4889 | 0.4614 | 16.803 | 0.5115 |
| A-7 | 0.34 | 0.51 | 0.37 | 16.01 | 2.85 | — | — | 0.10 | 0.4674 | 0.4418 | 13.115 | 0.6095 |
| A-8 | 0.43 | 0.42 | 0.28 | 16.03 | 2.91 | 0.52 | 1.01 | 0.14 | 0.626 | 0.4426 | 10.483 | 0.6085 |
| A-9 | 0.35 | 0.70 | 0.25 | 18.02 | 1.56 | 1.02 | — | 0.16 | 0.5638 | 0.4524 | 12.218 | 0.509 |
| A-10 | 0.31 | 0.49 | 0.29 | 17.02 | 1.98 | 0.54 | — | 0.17 | 0.5129 | 0.4292 | 14.704 | 0.559 |
| B-1 | 0.67 | 0.50 | 0.53 | 12.97 | 0.02 | — | — | — | 0.7336 | 0.15 | -17.114 | 0.7615 |
| B-2 | 1.04 | 0.45 | 0.60 | 17.23 | 0.38 | — | — | — | 1.112 | 0.34 | -28.316 | 0.5485 |
| B-3 | 0.43 | 0.30 | 0.31 | 13.02 | — | — | — | 0.13 | 0.5751 | 0.1428 | -2.43 | 0.759 |
| B-4 | 0.46 | 0.45 | 0.34 | 20.34 | 0.98 | — | — | 0.15 | 0.6253 | 0.5004 | 7.374 | 0.393 |
| B-5 | 0.49 | 0.30 | 0.31 | 15.56 | 0.97 | — | — | 0.18 | 0.6766 | 0.3026 | 2.111 | 0.632 |
| B-6 | 0.79 | 0.49 | 0.51 | 15.86 | — | — | — | 0.09 | 0.9259 | 0.264 | -16.99 | 0.617 |
| B-7 | 0.67 | 0.10 | 0.49 | 15.03 | — | — | — | — | 0.7288 | 0.2272 | -15.12 | 0.6585 |
| B-8 | 0.24 | 0.50 | 0.48 | 19.87 | 2.56 | — | — | 0.18 | 0.447< | 0.5784 | 22.918 | 0.4165 |
| B-9 | 0.20 | 0.49 | 0.50 | 17.23 | — | — | — | 0.17 | 0.4011 | 0.3188 | 13.33 | 0.5485 |
| B-10 | 0.38 | 0.57 | 0.59 | 12.38 | — | — | — | 0.08 | 0.5172 | 0.128 | -2.32 | 0.791 |
| B-11 | 0.40 | 0.42 | 0.50 | 15.46 | 1.03 | 1.00 | — | 0.18 | 0.6594 | 0.307 | 6.259 | 0.137 |
| B-12 | 0.45 | 0.50 | 0.48 | 15.20 | 0.50 | 0.46 | 0.46 | 0.18 | 0.6896 | 0.268 | 2.00 | 0.65 |
| B-13 | 0.32 | 0.38 | 0.50 | 12.94 | 0.98 | — | 0.56 | 0.17 | 0.5323 | 0.2016 | 6.874 | 0.763 |
| B-14 | 0.39 | 0.50 | 0.51 | 14.97 | — | 0.76 | — | 0.12 | 0.5888 | 0.2288 | 1.02 | 0.6615 |
| B-15 | 0.48 | 0.50 | 0.43 | 14.98 | 0.51 | — | — | 0.17 | 0.6727 | 0.2598 | 0.163 | 0.661 |
| B-16 | 0.50 | 0.49 | 0.49 | 15.90 | — | — | — | 0.13 | 0.6667 | 0.2656 | -2.7 | 0.615 |
| B-17 | 0.40 | 0.50 | 0.46 | 17.00 | 1.89 | — | — | 0.04 | 0.4884 | 0.4234 | 6.437 | 0.56 |
| B-18 | 0.39 | 0.52 | 0.47 | 18.01 | 2.79 | — | — | 0.03 | 0.4713< | 0.5186 | 10.367 | 0.5095 |

α: 0.04[eq1] − 0.39
β: −0.05 Cr % + 1.41
eq1 = Cr % + Si % + 1.5 Mo %
eq2 = C % + 0.83 N % + 0.12 Mn % + 0.05 Ni % + 0.02 Cu %

TABLE 20

| | No. | Kind of Steel | Heat Treatment | Microstructure | | Hardness (Hv) | Resistance to Corrosion | | Life Test L10 | |
| | | | | δ Ferrite | Eutectic Carbide | | Pitting Potential | Salt Water Spray | Clean Lubrication (× 10⁷) | Salt Water Cycle (× 10⁷) |
|---|---|---|---|---|---|---|---|---|---|---|
| Invention | 71 | A-1 | A | ○ | none | 694 | 369 | ◎ | 9.8 | 7.2 |
| | 72 | A-2 | A | ○ | none | 675 | 372 | ◎ | 8.4 | 7.7 |
| | 73 | A-3 | A | ○ | none | 687 | 341 | ◎ | 9.5 | 6.5 |
| | 74 | A-4 | A | ○ | none | 689 | 350 | ◎ | 8.7 | 6.4 |
| | 75 | A-5 | A | ○ | none | 691 | 348 | ◎ | 9.1 | 6.9 |
| | 76 | A-6 | A | ○ | none | 689 | 384 | ◎ | 10.3 | 8.9 |
| | 77 | A-7 | A | ○ | none | 671 | 356 | ◎ | 8.6 | 7.1 |
| | 78 | A-8 | A | ○ | none | 679 | 341 | ◎ | 9.2 | 5.8 |
| | 79 | A-9 | A | ○ | none | 680 | 376 | ◎ | 8.8 | 6.7 |
| | 80 | A-10 | A | ○ | none | 687 | 381 | ◎ | 9.0 | 8.3 |
| | 81 | A-4 | B | ○ | none | 683 | 243 | ◎ | 8.4 | 4.1 |
| | 82 | A-6 | B | ○ | none | 692 | 256 | ◎ | 9.4 | 4.9 |
| | 83 | A-10 | B | ○ | none | 690 | 261 | ◎ | 8.8 | 4.4 |
| Comparison | 84 | B-1 | A | ○ | 7 μm | 661 | -190 | × | 6.7 | 0.4 |
| | 85 | B-2 | A | ○ | 26 μm | 696 | -187 | × | 2.1 | 0.2 |
| | 86 | B-3 | A | ○ | none | 712 | 59 | × | 11.5 | 1.1 |
| | 87 | B-4 | A | ○ | 17 μm | 684 | -46 | × | 5.8 | 0.7 |
| | 88 | B-5 | A | ○ | none | 709 | 84 | × | 10.6 | 1.3 |
| | 89 | B-6 | A | ○ | 19 μm | 690 | -174 | × | 5.1 | 0.3 |
| | 90 | B-7 | A | ○ | 10 μm | 654 | -180 | × | 6.0 | 0.6 |
| | 91 | B-8 | A | × | none | 588 | — | — | — | — |
| | 92 | B-9 | A | ○ | none | 628 | 371 | ◎ | 4.9 | 3.2 |
| | 93 | B-10 | A | ○ | none | 673 | 176 | Δ | 8.9 | 1.5 |
| | 94 | B-11 | A | ○ | none | 699 | 216 | Δ | 9.1 | 2.3 |
| | 95 | B-12 | A | ○ | none | 697 | 198 | Δ | 9.3 | 1.3 |
| | 96 | B-13 | A | ○ | none | 701 | 220 | Δ | 11.1 | 1.9 |
| | 97 | B-14 | A | ○ | none | 695 | 206 | Δ | 9.7 | 2.3 |
| | 98 | B-15 | A | ○ | none | 694 | 112 | × | 8.8 | 1.4 |
| | 99 | B-16 | A | ○ | none | 693 | -14 | × | 9.4 | 0.8 |
| | 100 | B-17 | A | ○ | none | 675 | 209 | Δ | 8.4 | 2.8 |
| | 101 | B-18 | A | × | none | 594 | — | — | — | — |

Example VIII

This example corresponds to the above-mentioned eighth embodiment.

Alloy components of materials to be subjected to the test and steels for comparison are shown in Table 21. The heat treatment, the test for evaluating the resistance to corrosion and the rolling life test were conducted in the same manner as with Example VII, and results thereof are shown in Table 22.

The high-temperature life test was carried out under the following conditions using a deep groove ball bearing 6206.

High-Temperature Life Test
  Temperature: 170° C.
  P/C: 0.71
  Lubrication: Jet oil
  Ball: M50

From Tables 21 and 22, in the steel V of the invention, (1) formation of a coarse eutectic carbide is prevented by satisfying C %≦−0.05 Cr %+1.41, (2) a reduction in hardness due to formation of δ-ferrite harmful to the toughness and life and an increase of residual austenite is also prevented by allowing the mutual relationship between (eq1)= Cr %+Si %+1.5 Mo %+3.5 V % and (eq2)=C %+0.83 N %+0.12 Mn %+0.05 (Ni+Co) %+0.02 Cu % to satisfy (eq2)≧0.04×(eq1)−0.39 and satisfying (eq2)≦0.8, and (3) the pitting index PI value satisfies PI=Cr %+3.3 Mo %+30 N %−45 C %≧10.0, and the total content of C and N satisfies C+N≧0.4%, so that the steel V of the invention is very high in hardness and excellent in resistance to corrosion. Further, (4) the high-temperature life characteristics required for bearings used at relatively high temperatures are also good by optimizing the compositions of Mo+V and Co+Ni contained. As apparent from Table 22, in (C-1) to (C-12) (examples 101 to 112) which are examples of the invention in the case of treatment B, substrates are solid solution strengthened with the alloy components of Co and Ni, and secondarily hardened with carbides and nitrides of Mo, V, Cr and the like. Accordingly, the resistance to corrosion, the life under corrosive circumstances and the high-temperature life are all good. Examples 113 and 114 are examples treated by treatment A, and extremely good in resistance to corrosion and life under corrosive circumstances. However, the high-temperature life test, which is a test carried out at a temperature approximately similar to the tempering temperature, was not performed because this method is unfavorable on consideration of dimensional changes.

In comparative examples 115, 116 and 122 to 127, the content of Co+Ni or Mo+V is less than that of the invention, so that they are inferior in high-temperature life. Comparative examples 117, 119, 128 and 129 do not satisfy the relationship of the above (2), and δ-ferrite was formed. Accordingly, the subsequent evaluations were not conducted. Comparative examples 118 and 120 do not satisfy (eq2)≦0.8 of the above (2), and therefore, residual austenite is stabilized to fail to obtain sufficient hardness, resulting in failure to obtain good life. Comparative example 121 does not satisfy C+N≧0.4% of the above (3), so that sufficient hardness is not obtained, resulting in failure to obtain good life. Further, comparative examples 122, 123 and 126 do not satisfy PI of the above (3), and are inferior to the examples of the invention in resistance to corrosion. In particular, comparative example 126 does not satisfy the above (1), so that the resistance to corrosion and the life are extremely deteriorated by the eutectic carbide. Comparative example 125 satisfies PI of the above (3), but does not satisfy the above (1). Accordingly, the resistance to corrosion and the life are deteriorated by the eutectic carbide.

Figure 6:
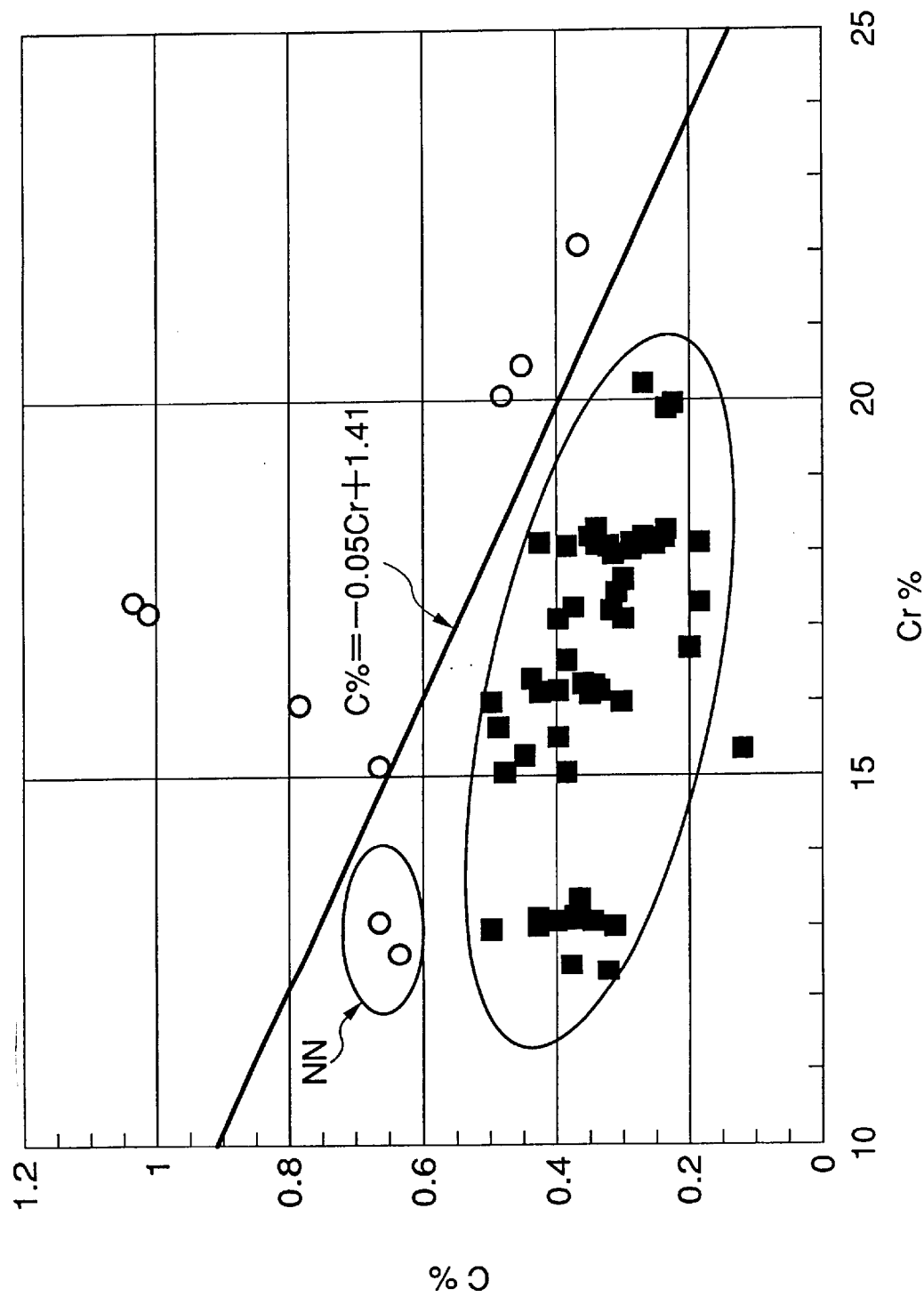
FIG. 6 is a graph showing a correlation between the C content and the Cr content.

FIG. 6 is a graph showing a correlation between the C content and the Cr content, and when the relationship of the above (1) is not satisfied, formation of coarse eutectic carbides having a size having 3 μm or more is shown. In FIG. 6, "○" indicates the formation of eutectic carbides having a size having 3 μm or more, "■" indicates no formation of eutectic carbides, and "NN" indicates non-addition of nitrogen. The steel V of the invention satisfies the relationship of the above (1), so that no eutectic carbide is formed, as shown in FIG. 6. Even if the relationship of (1) is satisfied, an eutectic carbide is sometimes exceptionally formed when no nitrogen is contained. Further, formation of an eutectic carbide deteriorates induction hardenability, resulting in difficulty in obtaining sufficient hardened layer depth, or penetration thereof allows unevenness in hardness to develop. It is therefore very important to satisfy this relational equation.

Figure 7:
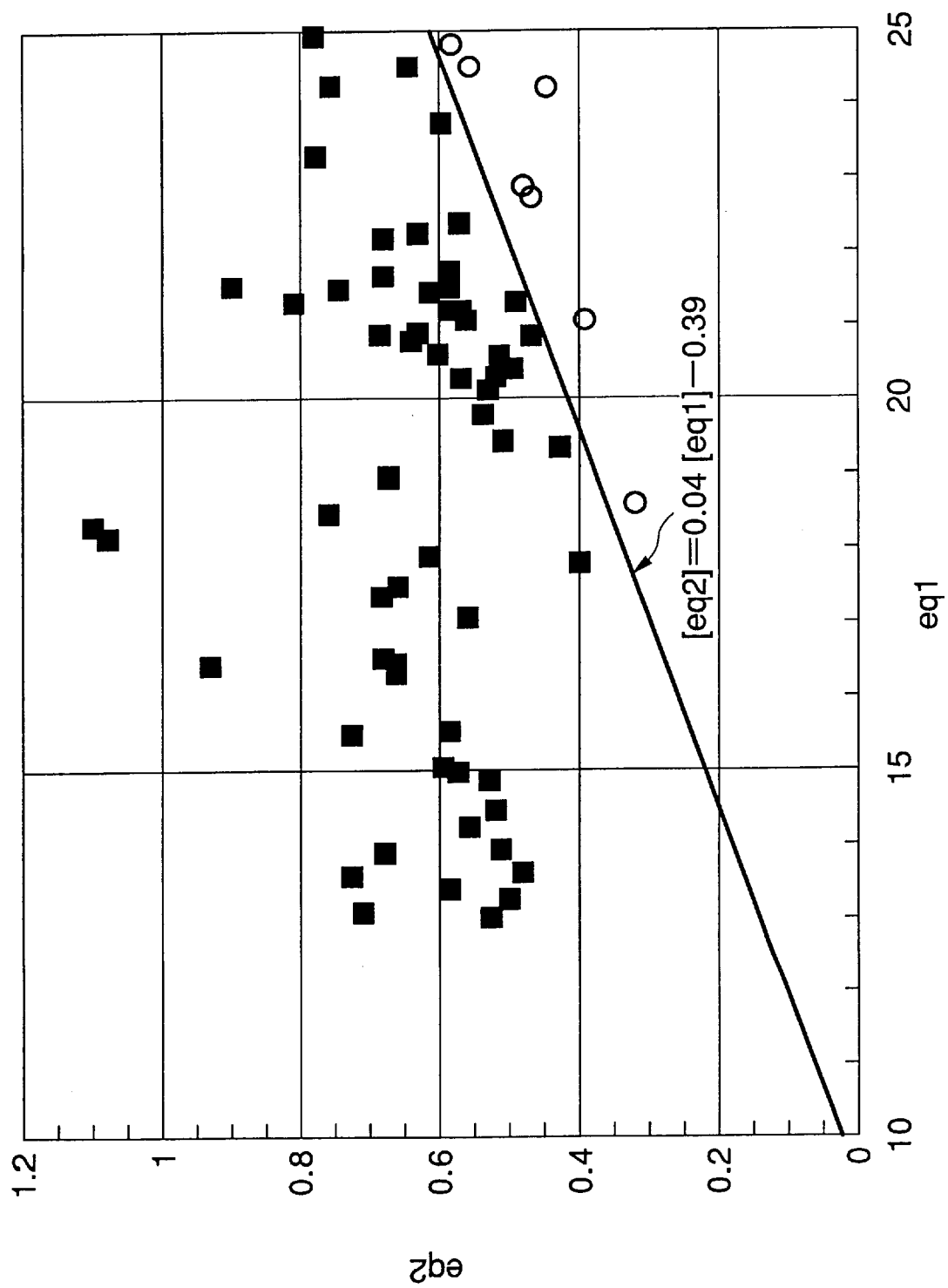
FIG. 7 is a graph showing a correlation between eq1 and eq2.

FIG. 7 is a graph showing a correlation between eq1 and eq2, in which "○" indicates the formation of δ-ferrite and "■" indicates no formation of δ-ferrite. When the relationship of (eq2)≧0.04×(eq1)−0.39 of the above (2) is not satisfied, formation of δ-ferrite harmful to toughness is shown. The steel V of the invention satisfies this relational equation, so that no δ-ferrite is formed.

From the above, it is the minimum requirement for the present invention to satisfy the above (1) and (eq2)≧0.04× (eq1)−0.39 of the above (2).

Figure 8:
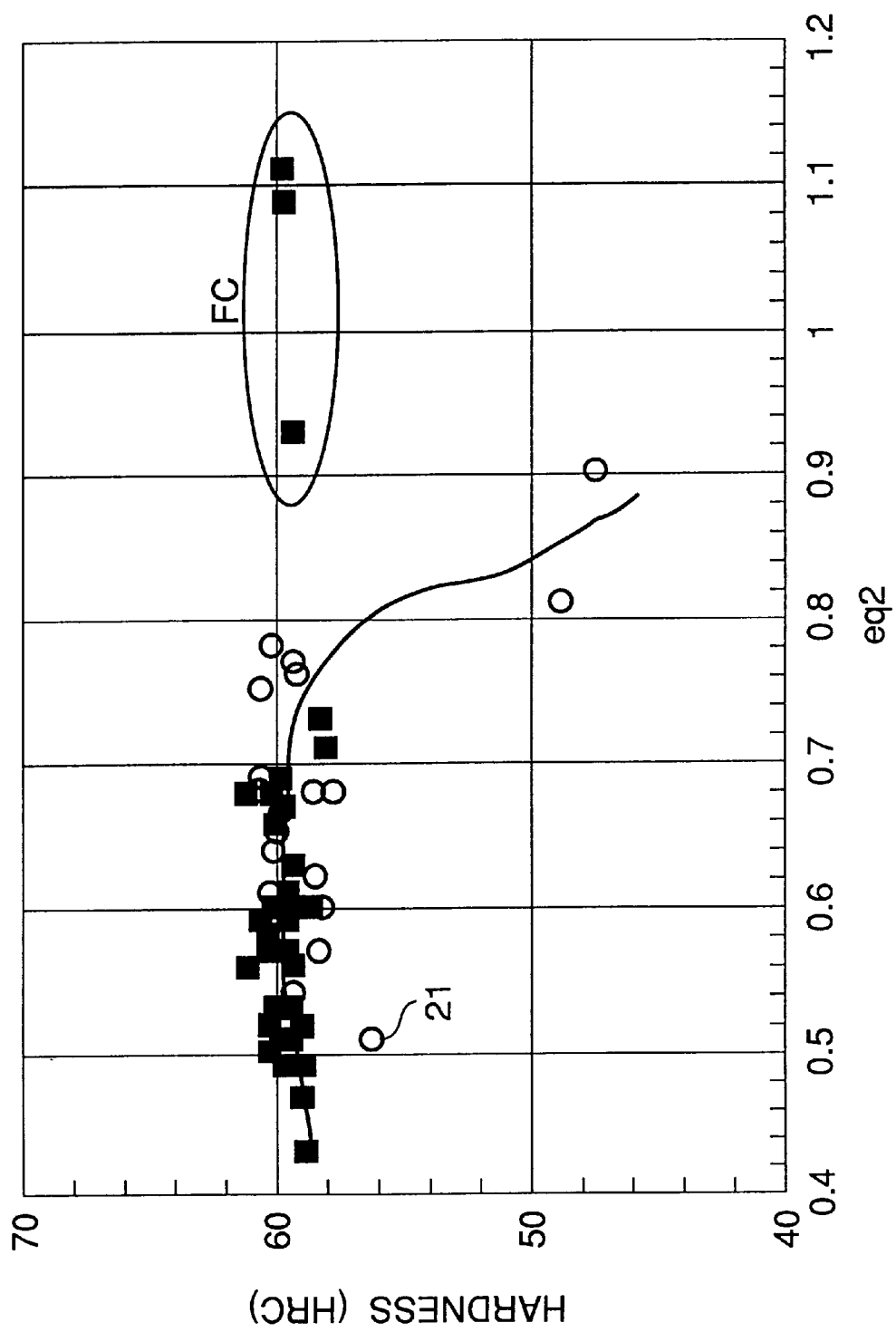
FIG. 8 is a graph showing the relationship of hardness (HRC) to eq2.

Further, stainless steels are extremely inferior to low alloy steels in machinability and cold workability. It is therefore one feature of the present invention to improve them. In order to improve them, it is necessary to satisfy 0.40≦C+ N≦0.7, eq1≦14.0 and eq2≦0.8, in addition to the above-mentioned conditions of (1) and (2). This is particularly important, because when eq2≦0.8 is not satisfied, austenite is stabilized and a large amount of residual austenite remains after hardening, resulting in failure to obtain sufficient hardness, as shown in FIG. 8, in which "■" indicates heat treatment A and "○" indicates heat treatment B, and "FC" indicates the formation of eutectic carbides.

Figure 9:
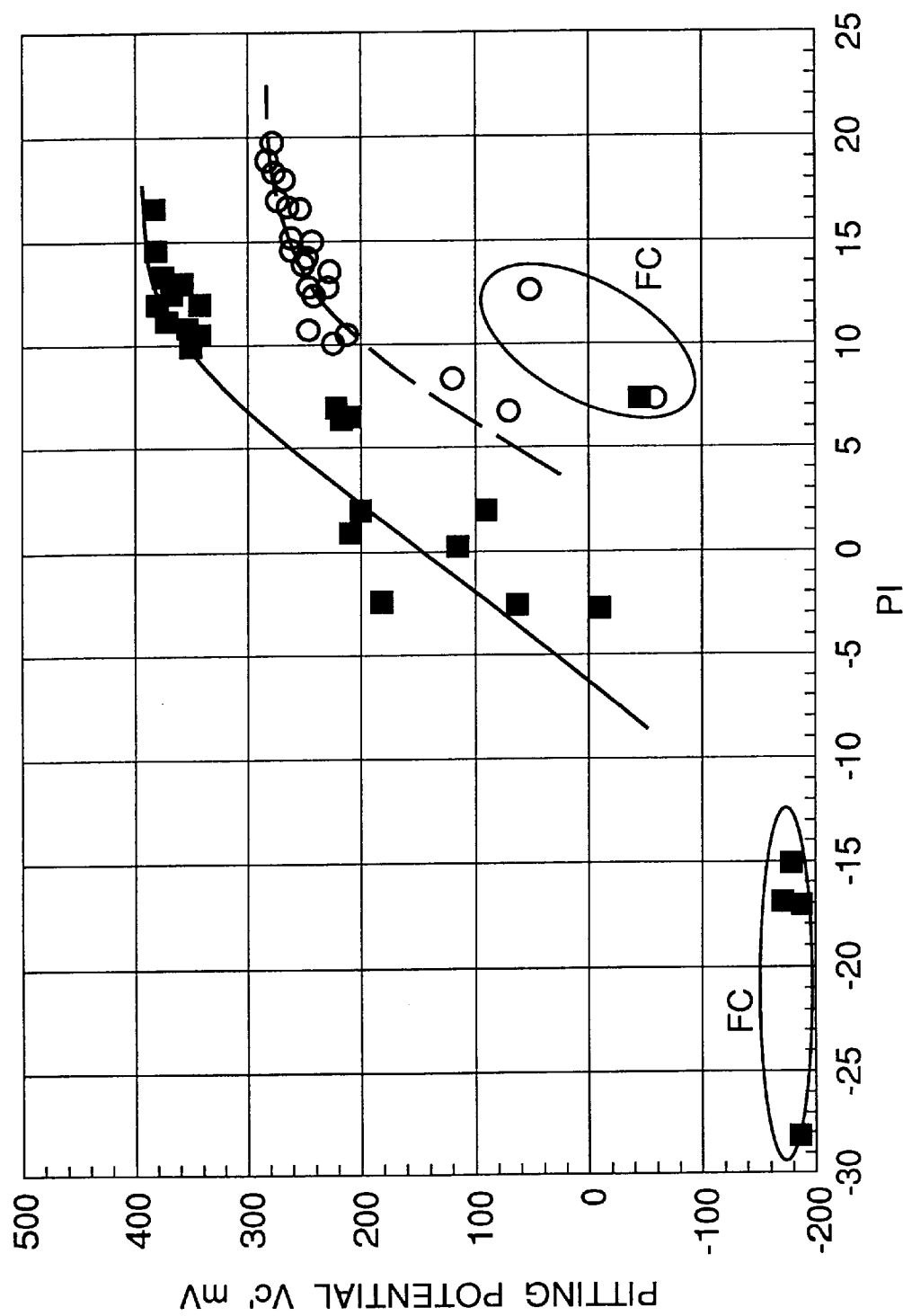
FIG. 9 is a graph showing a correlation between the PI value and the pitting potential.

Furthermore, it is another feature of the present invention to remarkably improve the resistance to corrosion of the conventional martensitic stainless steels. FIG. 9 shows a correlation between the PI value and the pitting potential, which is a relational equation discovered by the present inventors. "■" indicates heat treatment A and "○" indicates heat treatment B, and "FC" indicates the formation of eutectic carbides. As apparent from the figure, the higher PI value tends to result in the higher pitting potential, and the resistance to corrosion is remarkably improved at a PI value of 10.0 or more of the present invention. When a coarse eutectic carbide is contained, it tends to become difficult to obtain good resistance to corrosion even if the PI value is high.

A further feature of the present invention is to improve the high-temperature life when rolling fatigue is applied at a relatively high temperature. FIG. 10 shows a correlation between the content of Co+Ni or Mo+V and the high-temperature life, which is a relational graph discovered by the present inventors. In FIG. 10, "⊙", "△", and "×" indicate a life of 200 hours or more, 100 hours or more, and less than 100 hour, respectively. Co and Ni mainly perform solid solution hardening of the substrates, and Mo and V are mainly finely precipitated in the substrates for dispersion strengthening. This shows that too small the content of Co+Ni or Mo+V results in difficulty of obtaining good high-temperature life.

As described above, the present invention provides the high corrosion resisting martensitic stainless steels for rolling in which particularly the resistance to corrosion, the life, and further the high-temperature life of the conventional stainless steels are significantly improved, and which can be used for through hardening.

TABLE 21

| Kind of Steel | C | Si | Mn | Cr | Mo | Ni | Cu | Co | V | N | eq1 | eq2 | α | β | PI |
|---|---|---|---|---|---|---|---|---|---|---|---|---|---|---|---|
| C-1 | 0.25 | 0.31 | 0.29 | 18.12 | 2.03 | 0.06 | 0.06 | 2.98 | — | 0.18 | 21.48 | 0.59 | 0.47 | 0.50 | 18.97 |
| C-2 | 0.30 | 0.45 | 0.30 | 17.98 | 0.96 | 0.50 | 0.05 | 1.95 | 0.52 | 0.16 | 21.69 | 0.59 | 0.48 | 0.51 | 12.45 |
| C-3 | 0.31 | 0.38 | 0.28 | 15.89 | 2.97 | 0.08 | 0.07 | 3.01 | — | 0.17 | 20.73 | 0.64 | 0.44 | 0.62 | 16.84 |
| C-4 | 0.25 | 0.40 | 0.27 | 19.85 | 1.03 | 1.03 | 0.07 | 6.02 | 0.43 | 0.17 | 23.30 | 0.78 | 0.54 | 0.42 | 17.10 |
| C-5 | 0.37 | 0.39 | 0.29 | 16.12 | 2.85 | 0.08 | 0.07 | 2.87 | — | 0.17 | 20.79 | 0.69 | 0.44 | 0.60 | 13.98 |
| C-6 | 0.29 | 0.50 | 0.33 | 18.01 | 2.01 | 0.08 | 1.04 | 3.02 | 0.85 | 0.18 | 24.50 | 0.65 | 0.59 | 0.51 | 16.99 |
| C-7 | 0.29 | 0.45 | 0.30 | 17.99 | 2.00 | 0.07 | 0.06 | 2.80 | — | 0.17 | 21.44 | 0.61 | 0.47 | 0.51 | 16.64 |
| C-8 | 0.28 | 0.46 | 0.31 | 18.11 | 0.57 | 0.40 | 0.98 | 1.94 | 0.32 | 0.18 | 20.55 | 0.60 | 0.43 | 0.50 | 12.79 |
| C-9 | 0.39 | 0.51 | 0.27 | 17.99 | 2.10 | 0.97 | 0.07 | 1.08 | — | 0.18 | 21.65 | 0.68 | 0.48 | 0.51 | 12.77 |
| C-10 | 0.43 | 0.47 | 0.29 | 18.03 | 1.98 | 0.87 | 0.06 | 1.99 | — | 0.17 | 21.47 | 0.75 | 0.47 | 0.51 | 10.31 |
| C-11 | 0.29 | 0.43 | 0.28 | 17.50 | 2.94 | 0.98 | 0.07 | 4.87 | 0.74 | 0.18 | 24.93 | 0.77 | 0.61 | 0.54 | 19.55 |
| C-12 | 0.32 | 0.41 | 0.29 | 18.02 | 1.78 | 0.08 | 0.07 | 5.03 | 0.74 | 0.18 | 23.69 | 0.76 | 0.56 | 0.51 | 14.89 |
| D-1 | 0.31 | 0.38 | 0.35 | 17.50 | 2.97 | 1.01 | 0.07 | 0.57 | — | 0.17 | 22.34 | 0.57 | 0.50 | 0.54 | 18.45 |
| D-2 | 0.25 | 0.35 | 0.33 | 18.22 | 0.76 | 1.04 | 0.08 | 1.02 | — | 0.17 | 19.71 | 0.54 | 0.40 | 0.50 | 14.58 |
| D-3 | 0.26 | 0.33 | 0.48 | 18.02 | 2.98 | 1.03 | 0.06 | 1.02 | 0.48 | 0.17 | 24.50 | 0.56 | 0.59 | 0.51 | 21.25 |
| D-4 | 0.38 | 0.37 | 0.49 | 17.12 | 2.67 | 1.98 | 0.06 | 4.22 | — | 0.18 | 21.50 | 0.90 | 0.47 | 0.55 | 14.23 |
| D-5 | 0.28 | 0.45 | 0.37 | 20.12 | 2.80 | 0.53 | 0.96 | 1.50 | — | 0.17 | 24.77 | 0.59 | 0.60 | 0.40 | 21.86 |
| D-6 | 0.33 | 0.30 | 0.38 | 17.98 | 1.99 | 0.98 | 1.02 | 4.30 | — | 0.18 | 21.27 | 0.81 | 0.46 | 0.51 | 15.10 |
| D-7 | 0.20 | 0.45 | 0.32 | 18.01 | 1.20 | 1.00 | 1.40 | 1.10 | — | 0.17 | 20.26 | 0.51 | 0.42 | 0.51 | 18.07 |
| D-8 | 0.36 | 0.38 | 0.47 | 15.98 | 0.98 | 0.08 | 0.07 | 1.01 | — | 0.18 | 17.83 | 0.62 | 0.32 | 0.61 | 8.41 |
| D-9 | 0.44 | 0.34 | 0.29 | 16.22 | 1.56 | 0.89 | 0.06 | 0.46 | — | 0.17 | 18.90 | 0.68 | 0.37 | 0.60 | 6.67 |
| D-10 | 0.29 | 0.30 | 0.30 | 17.98 | 0.98 | 1.40 | 0.50 | 0.28 | 0.40 | 0.18 | 21.15 | 0.57 | 0.46 | 0.51 | 13.56 |
| D-11 | 0.38 | 0.30 | 0.29 | 21.98 | 0.98 | 0.98 | 0.07 | — | — | 0.16 | 23.75 | 0.60 | 0.56 | 0.31 | 12.91 |
| D-12 | 0.49 | 0.33 | 0.32 | 19.98 | 1.23 | 0.07 | 0.08 | — | — | 0.18 | 22.16 | 0.68 | 0.50 | 0.41 | 7.39 |
| D-13 | 0.30 | 0.32 | 0.33 | 17.20 | 0.57 | 1.02 | 0.98 | 4.10 | — | 0.17 | 18.38 | 0.76 | 0.35 | 0.55 | 10.68 |
| D-14 | 0.12 | 0.40 | 0.34 | 15.38 | 1.89 | 0.06 | 0.07 | — | — | 0.16 | 18.62 | 0.30 | 0.35 | 0.64 | 21.02 |
| D-15 | 0.21 | 0.43 | 0.30 | 16.78 | 0.97 | 0.06 | 0.07 | — | 0.67 | 0.17 | 21.01 | 0.39 | 0.45 | 0.57 | 15.63 |

α: 0.04[eq1] − 0.39
β: −0.05 Cr % + 1.41
eq1 = Cr % + Si % + 1.5 Mo % + 3.5 V %
eq2 = C % + 0.83 N % + 0.12 Mn % + 0.05 (Ni + Co) % + 0.02 Cu %

TABLE 22

| | No. | Kind of Steel | Heat Treatment | Microstructure δ Ferrite | Eutectic Carbide | Hardness (HRC) | Resistance to Corrosion Pitting Potential | Salt Water Spray | Life Test L10 Salt Water Cycle (× 10⁷) | 6206 High Temperature |
|---|---|---|---|---|---|---|---|---|---|---|
| Invention | 101 | C-1 | B | ○ | none | 59.8 | 282 | ⊙ | 5.8 | 292 |
| | 102 | C-2 | B | ○ | none | 60.0 | 242 | ⊙ | 6.2 | 290 |
| | 103 | C-3 | B | ○ | none | 60.1 | 264 | ⊙ | 5.9 | 298 |
| | 104 | C-4 | B | ○ | none | 60.3 | 272 | ⊙ | 4.5 | 318 |
| | 105 | C-5 | B | ○ | none | 60.6 | 247 | ⊙ | 5.4 | 312 |
| | 106 | C-6 | B | ○ | none | 60.0 | 266 | ⊙ | 5.6 | 309 |
| | 107 | C-7 | B | ○ | none | 60.3 | 258 | ⊙ | 6.0 | 287 |
| | 108 | C-8 | B | ○ | none | 60.1 | 244 | ⊙ | 5.3 | 291 |
| | 109 | C-9 | B | ○ | none | 60.5 | 229 | ⊙ | 4.4 | 270 |
| | 110 | C-10 | B | ○ | none | 60.7 | 212 | ⊙ | 4.1 | 275 |
| | 111 | C-11 | B | ○ | none | 60.1 | 275 | ⊙ | 5.7 | 321 |
| | 112 | C-12 | B | ○ | none | 60.2 | 246 | ⊙ | 5.1 | 315 |
| | 113 | C-7 | A | ○ | none | 59.6 | 378 | ⊙ | 9.3 | — |
| | 114 | C-8 | A | ○ | none | 59.4 | 368 | ⊙ | 9.0 | — |
| Comparison | 115 | D-1 | B | ○ | none | 59.6 | 275 | ⊙ | 4.4 | 173 |
| | 116 | D-2 | B | ○ | none | 59.4 | 252 | ⊙ | 4.3 | 167 |
| | 117 | D-3 | B | × | none | 54.2 | — | — | — | — |
| | 118 | D-4 | B | ○ | none | 47.6 | 248 | ⊙ | 0.8 | — |
| | 119 | D-5 | B | × | none | 54.8 | — | — | — | — |
| | 120 | D-6 | B | ○ | none | 49.0 | 255 | ⊙ | 1.1 | — |
| | 121 | D-7 | B | ○ | none | 56.3 | 267 | ⊙ | 2.1 | 53 |
| | 122 | D-8 | B | ○ | none | 58.5 | 117 | ○ | 2.2 | 102 |
| | 123 | D-9 | B | ○ | none | 58.6 | 69 | Δ | 1.6 | 116 |
| | 124 | D-10 | B | ○ | none | 58.4 | 226 | ⊙ | 4.4 | 79 |
| | 125 | D-11 | B | ○ | 8 μm | 58.3 | 49 | Δ | 1.0 | 67 |
| | 126 | D-12 | B | ○ | 13 μm | 58.0 | −59 | × | 0.3 | 59 |

TABLE 22-continued

| | | | Microstructure | | | Resistance to Corrosion | | Life Test L10 | |
| | | | | | | | Salt | Salt Water | |
| No. | Kind of Steel | Heat Treatment | δ Ferrite | Eutectic Carbide | Hardness (HRC) | Pitting Potential | Water Spray | Cycle (× 10⁷) | 6206 High Temperature |
|---|---|---|---|---|---|---|---|---|---|
| 127 | D-13 | B | ○ | none | 58.5 | 231 | ◉ | 2.4 | 89 |
| 128 | D-14 | B | × | none | 52.1 | — | — | — | — |
| 129 | D-15 | B | × | none | 53.4 | — | — | — | — |

As described above, according to the present invention, it becomes possible to provide the inexpensive rolling apparatuses improved in resistance to fretting, acoustic performance, resistance to corrosion, life and workability.

While the invention has been described in detail and with reference to specific embodiments thereof, it will be apparent to one skilled in the art that various changes and modifications can be made therein without departing from the spirit and scope thereof.

What is claimed is:

1. A rolling bearing having a plurality of bearing members comprising an outer race and an inner race or a shaft element, and a plurality of rolling elements disposed between the outer race and the inner race or the shaft element, wherein the outer race and the inner race or the shaft element are formed of a high carbon steel containing 0.8% to 1.5% by weight of C, 0.1% to 2.0% by weight of Cr, 0.1% to 1.5% by weight of Mn, 0.1% to 1.0% by weight of Si, and Fe and inevitable impurities as the balance, and the rolling elements are formed of a high Cr martensitic stainless steel.

2. The rolling bearing of claim 1, wherein the rolling elements are formed of a high Cr martensitic stainless steel containing 0.05% to less than 0.2% by weight of N.

3. A rolling bearing, wherein at least one of the outer race and the inner race or the shaft element is formed of a martensitic stainless steel which contains 0.30% to 0.45% by weight of C, 10.5% to 13.5% by weight of Cr, 0.1% to 0.8% by weight of Mn, 0.1% to 1.0% by weight of Si, 0.05% to 0.19% by weight of N, and Fe and inevitable components as the balance, wherein C+N is 0.5% by weight or more, and the rolling elements are formed of a high carbon steel containing 0.8% to 1.5% by weight of C, 0.1% to 2.0% by weight of Cr, 0.1% to 1.5% by weight of Mn, 0.1% to 1.0% by weight of Si, and Fe and inevitable impurities as the balance.

4. The rolling bearing of claim 3, wherein the outer race and the inner race or the shaft element are formed of a material containing a carbide having a particle size of 2.0 μm or less and an area fraction of 5% or less, and at least one of the rolling elements, the outer race, and the inner race or the shaft element satisfy at least one of O≦20 ppm, Ti+0.1Al≦50 ppm and S≦100 ppm.

* * * * *